US006319126B1

(12) United States Patent
Tamaki

(10) Patent No.: US 6,319,126 B1
(45) Date of Patent: Nov. 20, 2001

(54) GAME MACHINE DETACHABLE COIN SENDING DEVICE FOR COINS INSERTED IN A LUMP

(75) Inventor: Masami Tamaki, Tokyo (JP)

(73) Assignee: Aruze Co., Ltd., Tokyo (JP)

( * ) Notice: Subject to any disclaimer, the term of this patent is extended or adjusted under 35 U.S.C. 154(b) by 0 days.

(21) Appl. No.: 09/542,977

(22) Filed: Apr. 4, 2000

(30) Foreign Application Priority Data

Apr. 22, 1999 (JP) ................................................ 11-115561

(51) Int. Cl.[7] ...................................................... A63F 13/00

(52) U.S. Cl. .......................... 463/25; 463/20; 273/148 R; 194/343; 453/12

(58) Field of Search ................................. 463/16, 20, 25; 273/148 R, 121 B; 453/12, 34, 57; 194/217, 343

(56) References Cited

U.S. PATENT DOCUMENTS 5,355,988 * 10/1994 Shirasawa ............................ 194/217
5,386,995 * 2/1995 Takemoto et al. ............... 273/148 R
5,469,951 * 11/1995 Takemoto et al. ................... 194/206

FOREIGN PATENT DOCUMENTS 6-170058 * 6/1994 (JP) .

* cited by examiner

*Primary Examiner*—Jessica J. Harrison
*Assistant Examiner*—John M Hotaling, II
(74) *Attorney, Agent, or Firm*—Bacon & Thomas, PLLC

(57) ABSTRACT

A game machine wherein there is provided an attach-detach guide means D for guiding attaching and detaching of a coin-sending device C with respect to the game machine body 8 and causing an outlet passing C20 of the device C to be aligned with a communicating opening at the body 8 at an attach-finish position of the coin-sending device C with respect to the game machine body, thereby easily connecting passages and excellently receiving and transferring coins to a coin-payout hopper or the like arranged for following stages; upon detaching operation, the coin-sending device C is guided by the guide means D to be removed from the machine body 8, thereby simultaneously disengaging the outlet passage C20 from the communicating opening and providing simple separation of passages.

6 Claims, 33 Drawing Sheets

Cross section taken in BX－BX in Fig.13

GAME MACHINE DETACHABLE COIN SENDING DEVICE FOR COINS INSERTED IN A LUMP

DETAILED DESCRIPTION OF THE INVENTION

1. Field of the Invention

The present invention relates to an improvement of a game machine, such as a reel-rotating type called a "Pachinko" type slot machine (abbreviated to "Pachi-slot"), a general type of slot machines, and other game machines including a so-called "Pachinko", "Arrange-ball", and "Majong-ball", and various game machines.

2. Prior Art

A most typical and normal type of coin slot J of the Pachinko type of slot machine P is, as disclosed in Examined Japanese Patent Application No. Hei 6-73563 (1994) and as shown in FIG. 40 annexed hereto, provided in the form of a slit-shaped opening into which each of coins M can be put one by one, so that players place coins into the slot one by one by their hands. Inserting coins one by one is troublesome for the players. But coins inserted are received by the machine one by one sequentially and sent to further stages. Thus, at downstream side of the slot J and at the upstream side of the coin payout hopper H is disposed a small sized coin-separator S1 relatively simple in construction and having a solenoid type separator part in combination with a coin detector N1. This kind of coin-separator S1 is usually integrally assembled along a coin-passage at the downstream side of the coin-slot J by screwing or pawls-engagement.

To mitigate the trouble of players inserting coins one by one, some machines recently given attention use a wide tray W for inserting coins in a lump, so that players can place a number of coins M all together into the machine at a time. The lump-insertion tray W shown in FIG. 40 showing the aforesaid Japanese publication is used jointly together with the coin slot J that is for inserting coins one by one. Coins M inserted in a lump from the wide tray W need to be first sequentially sent one by one at the upstream side of the coin detector N2 and coin separator S2, and there is interposed at the downstream side of the coins-lump insertion part W a coin-sending device F having a hopper type drive mechanism. In FIG. 40, K designates a reels panel, R a switches mounting part, S a control switch for driving the coin-sending device F, O a coin-payout opening, and E a payout tray.

The coin-sending device F which sequentially sends coins (inserted in a lump) to take them into the inside has a hopper type drive mechanism to be relatively large in size and higher in weight, so that it does not employ the feature of being integrally assembled along the coin-passage as used in the conventional small-sized coin separator S1. Moreover, the coin-sending device, which is to take coins into the game machine not like the coin-payout hopper H, needs its outlet passage to be aligned, in the inside of the game machine body, with a communication port on the same, leading to a problem of complexity of a passage connecting structure.

The coin-sending device F communicates a wide tray (coins-lump insertion part) W, so that there is a high possibility of insertion of miscellaneous things such as ash of cigaret, dust, trash, or juices by irresistable force or inadvertency, and also a possibility of being intentionally damaged by mischieves or illegal acts, in comparison with the slit-shaped coin slot J for one-by-one insertion. Furthermore, the coin-sending device F has to dispose of a number of and various coins before being discriminated by the coin-separator S2, not like the operation of the coin-payout hopper H, so that the coin-sending device is naturally apt to get dirty or smeared. Accordingly, the coin-sending device F is frequently to be detached from the game machine for maintenance or cleaning.

BRIEF DESCRIPTION OF THE INVENTION

The present invention has been designed under the above circumstances. An object of the invention is to provide a game machine wherein a coin-sending device in a lump-mounting type is attached to or detached from a game machine body easily by a one-touch operation, enabling maintenance and cleaning at ease.

The invention disclosed in claim 1 is a game machine comprising a machine body 8 provided with a coin-sending device C sequentially sending coins inserted in a lump to take them into the inside of the game machine, wherein there is provided an attach/detach guide means D which guides attaching and detaching of the coin-sending device C with respect to the game machine body 8 and causes an outlet passage C20 of the coin-sending device C at a position of having finished in attaching to be aligned with a communication opening D20 on the game machine body, as shown in FIGS. 3, 33 to 37, in order to achieve the aforesaid object.

The invention disclosed in claim 2 does, for easily connecting a removal passage C40 for false coins, as shown in FIG. 18, include in the coin-sending device C a coin-separation separation part C4, which discriminates true and false coins and cause false coins to be removed from the removal passage, and the removal passage C40 at the coin separation part C4 is aligned with the communication opening D40 on the machine body 8 at such a position that the coin-sending device C has finished in attaching to the game machine body 8 as shown in FIG. 35.

The invention disclosed in claim 3 provides a communication opening D20 or D40 of the game machine body on the bottom 92 of a support member 91 supporting the coin-sending device C, as shown in FIG. 35, for making especially excellent receiving and transferring coins.

The invention disclosed in claim 4 connects electric connectors C60 between the coin-sending device C and the game machine body 8 at such position that the coin-sending device C has finished in attaching to the machine body 8, as shown in FIG. 35, for making simple connecting electric connectors.

The invention disclosed in claim 5 causes an earth line C70 of the coin-sending device C to contact with a conductor part of the attach/detach guide means D and be connected with a casing earth of the game machine body 8, as shown in FIG. 36,for easily realizing countermeasures for static electricity.

The invention disclosed in claim 6 provides a detachable holding means D90 for holding the position of coin-sending device that the coin-sending device has finished in attaching to the game machine body 8, as shown in FIG. 37, for making higher reliability of the mounting the device against vibration or the like.

Next, functional effects of the inventions will be detailed.

In the invention disclosed in claim 1, as shown in FIGS. 34 to 37, the coin-sending device C upon mounting operation is guided by the attach/detach guide means D to be attached to the game machine body 8. At a position that the coin-sending device has finished in attaching to the machine body 8, the outlet passage C20 is brought into alignment with the communicating port D20 on the machine body, thereby providing simple and easy connecting of passages to thereby allow coins to be excellently received and transferred to a coin-payout hopper or the like arranged for following stages. Upon detaching operation, the coin-sending device C is guided by the guide means D to be disconnected from the game machine body 8. When the coin-sending device is shifted from the attach-finish position, the outlet passage C20 and communicating port D20 are disengaged from each other, thereby providing easy separation of passages. Due to the simple and easy attaching and detaching of the coin-sending device C with respect to the game machine body 8, the machine can be easily cleaned or subjected to maintenance.

According to the invention disclosed in claim 2, as seen in FIG. 35, at the attach-finish position of the coin-sending device with respect to the game machine body 8, the removal passage C40 at the coin separator C4 can be aligned with the communicating port D40 at the machine body 8, so that the removal passage C40 for false coins can be simply connected, thereby enabling false coins to be returned finely.

According to the invention in claim 3, as shown in FIG. 17, coins can be received and transferred by gravity from the coin-sending device C to the communicating ports D20 or D40 formed on the bottom 92 of the support member 91, whereby making especially excellent receiving and transferring coins.

In the invention disclosed in claim 4, as shown in FIG. 35, at the attach-finish position of the coin-sending device C with respect to the machine body 8, the electric connectors C60 between the device C and the body 8 are connected, thereby enabling the coin-sending device C to be further readily mounted to and disconnected from the game machine body 8.

According to the invention disclosed in claim 5, as shown in FIGS. 17 and 36, at the attach-finish position of the coin-sending device C with respect to the game machine body 8, earth line of the device C is caused to contact with the conductor part of the attach/detach guide means D and be automatically set to a casing earth at the game machine body 8, whereby necessitating no additional earthing and facilitating a simple and easy countermeasure for static electricity.

In the invention disclosed in claim 6, as shown in FIG. 37, at the attach-finish position of the coin-sending device with respect to the game machine body 8, the holding means D90 holds the attach-finish position, so that the coin-sending device C can be prevented from detaching from the body 8 unexpectedly due to vibration or the like, enjoy an increased reliability. Upon detaching operation, the holding means D90 is released to simply and easily detach the device C from the machine body 8.

Most Preferable Embodiments for using the Invention

Figure 1:
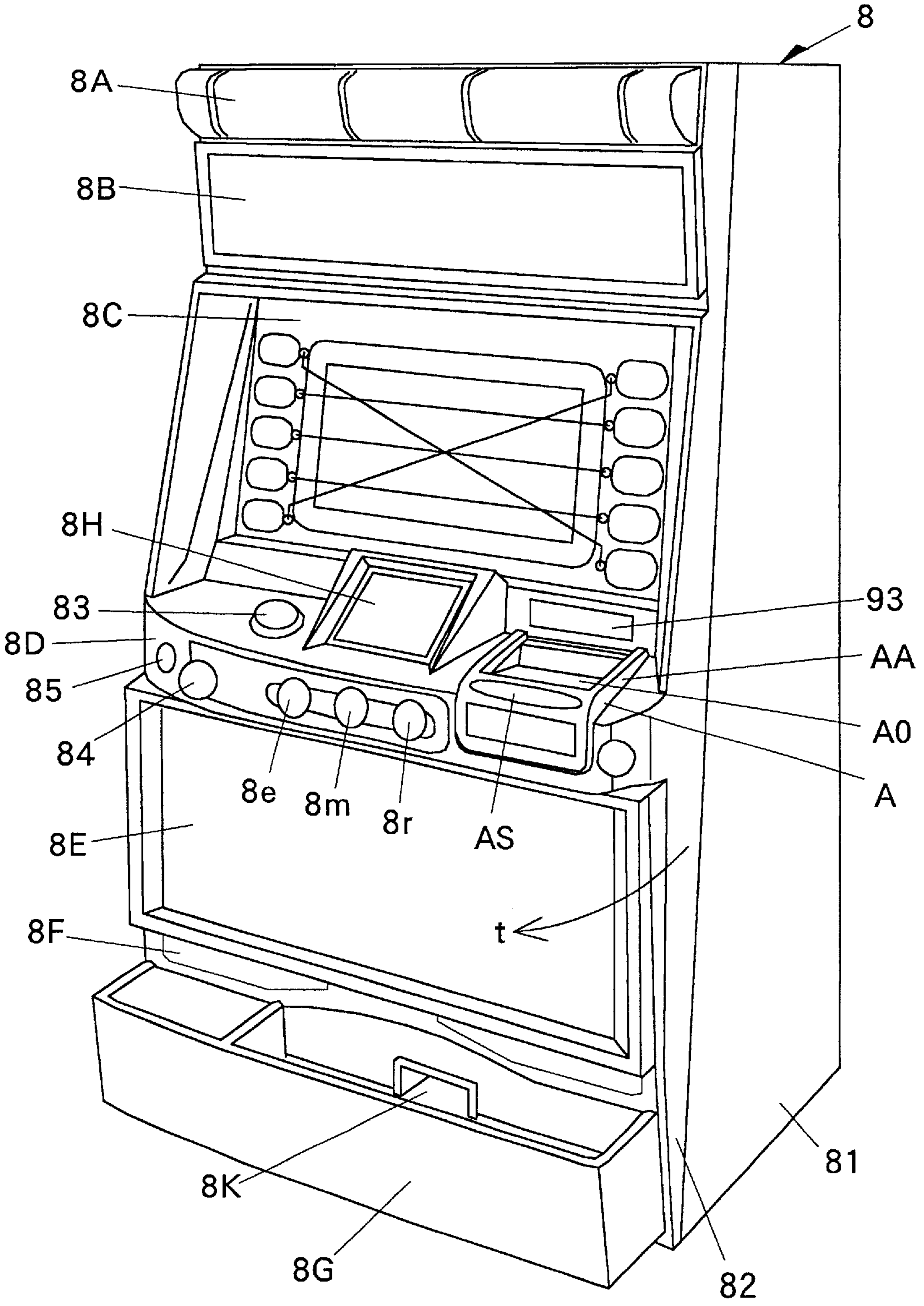
FIG. 1 is a perspective view of a game machine to which the present invention is applied.

FIG. 1 shows a game machine which is the pachinko type of slot machine incorporating the present invention. Coins referred to herein employ metal discs (called "game medals"), for example, of 24.6 to 25.5 mm in diameter and of 1.4 to 1.8 mm in thickness. A body 8 of game machine comprises a box-shaped casing 81 and a front door 82 openable in the direction indicated by the arrow t and is further provided with an indicator 8A showing the states of playing the game, an allotment panel 8B, a reel-part panel 8C, a switches-mounting part 8D, a waist panel 8E, a front-speaker panel 8F, and a coin-tray 8G. The switches-mounting part 8D includes a coins-lump insertion part A for receiving a plurality of coins at a time, and an image-display device 8H using a liquid crystal display or the like used for special dramatic effects in playing games or for explanation of the game.

Figure 2:
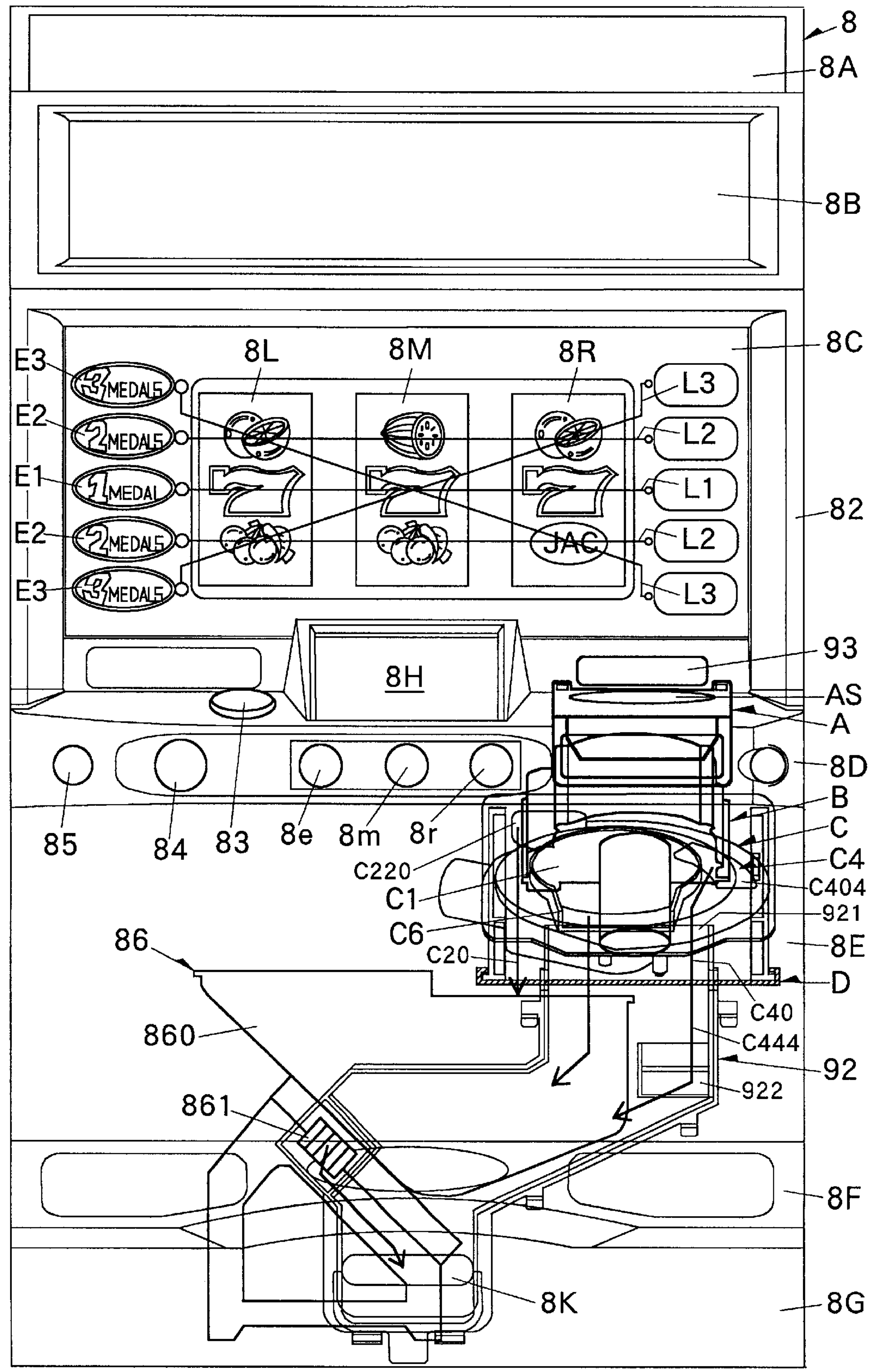
FIG. 2 is a front view of the game machine partially perspective of its inside.

As shown in FIG. 2, three mechanical reels 8L, 8M and 8R, on the outer peripheries of which figures such as "7", "cherries" and "oranges" are expressed,are housed inside the reel-part panel 8C. When the reels are stopped, three figures are seen one each reel. The number of the figures expressed on each reel is about twenty one (21). A bet switch 83 is provided for setting the number of coins to be bet for each play and may be depressed once for betting three coins, twice for two and three times or more for one coin. Depressing the switch 83 one time enables the three-coins betting which is most frequently used in playing the game. Alternatively, the number of coins to be bet may be directly proportional to the number of depressing the switch 83, or separate bet switches may be provided for specific numbers (one to three) of coins to be bet. According to the number of coins to be bet, judgement lines become valid, namely, a single coin when used or inserted causes the central judgement line L1 to become valid, two coins do so three judgement lines, i.e., the upper and lower lines L2 as well as the central one L1, and three coins do so five judgement lines including the slant lines L3. Indication lamps E1 to E3 are lit corresponding to specific judgement lines when become valid.

The game is started by moving up or down a game start switch 84 comprising a lever with a coin or coins having been bet by means of the bet switch, whereby the three reels 8L, 8M, 8R start simultaneously. The reels can be separately stopped by pushing stop buttons 8*e*, 8*m*, and 8*r* corresponding to the respective reels, and winnings and the number of coins to be alloted corresponding to winnings are determined according to a combination or combinations of the foregoing figures aligned on the valid judgement line(s). The reference numeral 85 designates a settlement switch for switching between a credit state, in which coins are credited to players or preliminarily memorized, with a predetermined upper limit of 50 coins, for a play or plays about to be started or occurring afterwards, and a settlement state in which the credit and coins remaining in the coin-sending device are paid out to appear onto the tray 8G.

Figure 3:
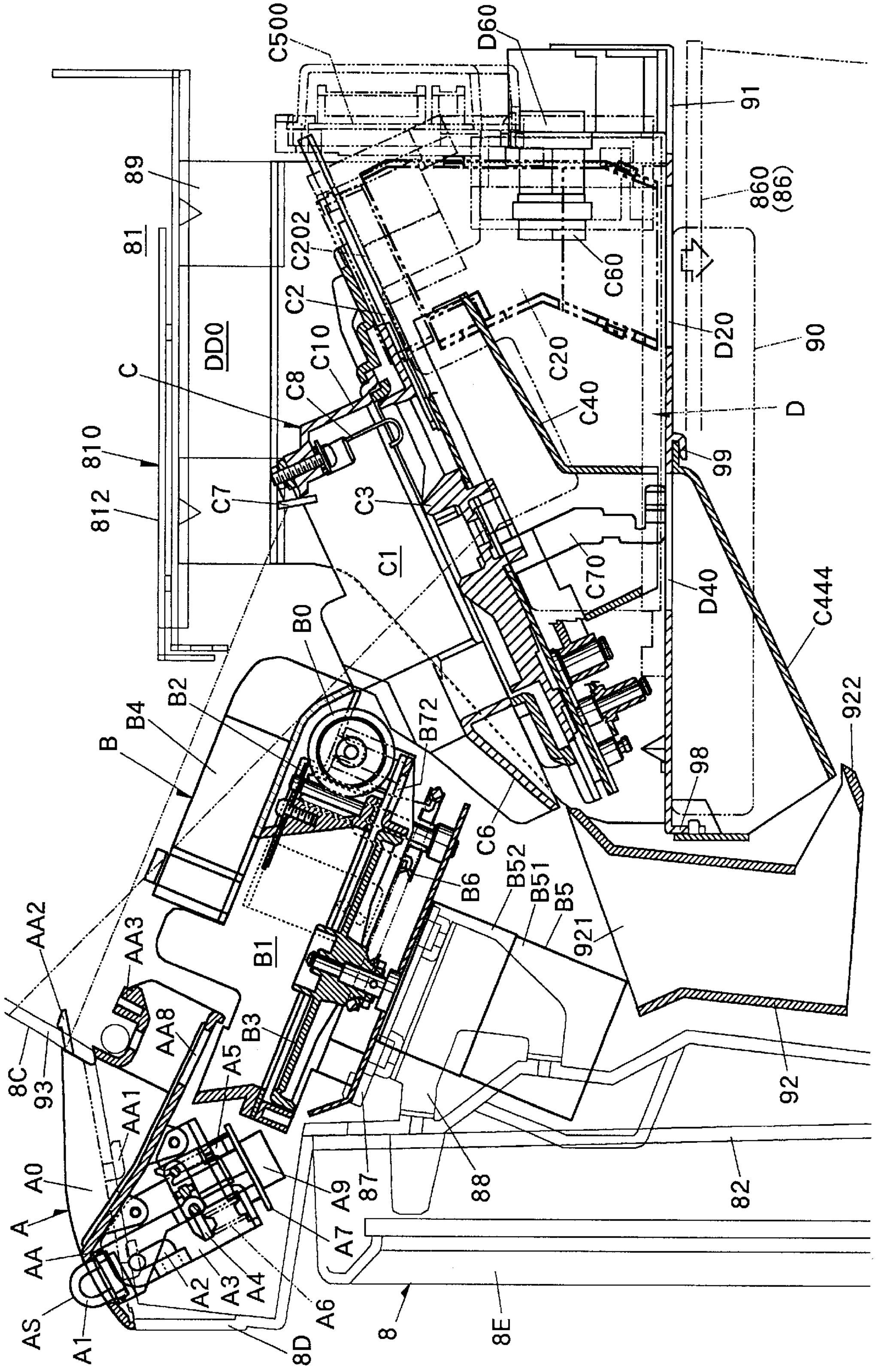
FIG. 3 is a sectional view of a principal portion of the same viewed from a lateral side.

As shown in FIG. 3, there are provided, at the downstream side of the coins-lump insertion part A inside the game machine body 8, a foreign objects separator B for capturing any foreign objects among the inserted things and removing the foreign objects from the coin-passage, and a coin-sending device which receives at a first-side reservoir C1 a number of coins from the separator B and sends the coins one by one sequentially to a coin-reserving backet 860 of a coin-payout hopper 86 provided at a lower part inside the machine body 8. The lump insertion part A is formed at an assembly AA and mounted to the switches-mounting part 8D by use of a fitting pawl AA1, retaining pawl AA2, and thread boss AA3 formed on the assembly AA. The foreign objects separator B is screwed at the rear of the front door 82 through brackets 87, 88. The coin-sending device C is detachably mounted, by means of an attach/detach guide means D having a rail mechanism, on a support member 91 supported on a frame 810 in the casing 81 through brackets 89, 90.

Mounted at the rear of the front door 82 is a cancel chute 92 connecting a coin payout and return part 8K (FIG. 2) formed inwardly of the coin tray 8G. The reels panel 8C above the coins lump insertion part A has a window 93 made of a transparent material for observing the inside of the first-side reservoir C1 in the coin-sending device. A mirror C7 set in the first-side reservoir C1 allows blind spots in the reservoir C1 to be seen from the observation window 93.

Figure 4:
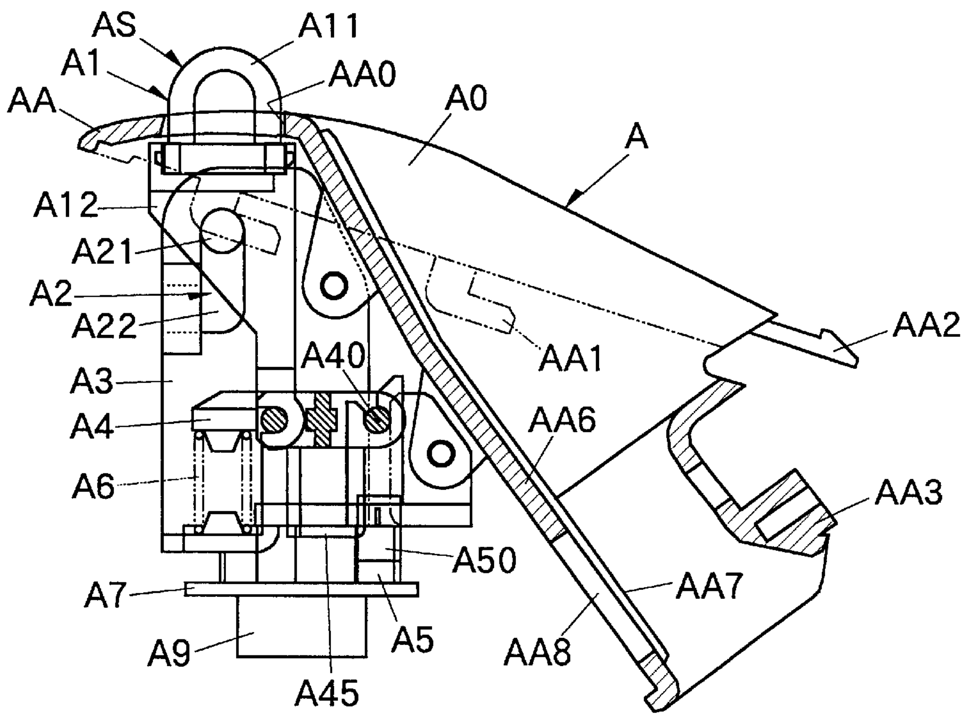
FIG. 4 is a partially sectional side view of a coin-lump insertion part.

FIG. 4 shows the assembly AA including the coins lump insertion part A and integrally provided with a control switch AS for driving the foreign objects separator B and the coin-sending device C, so that operations of inserting coins in a lump and taking them into the inside can be performed in a consecutive series of actions with an excellent controllability, and workability of assembling and exchanging parts may be improved. The control switch AS comprises a movable control member A1 which adjoins to an opening A0 of the insertion part A and is slidably and rotatably supported with respect to a guide member A3 forming a switch base, as indicated by the hollow arrow and an arrow q in FIG. 5.

Figure 6:
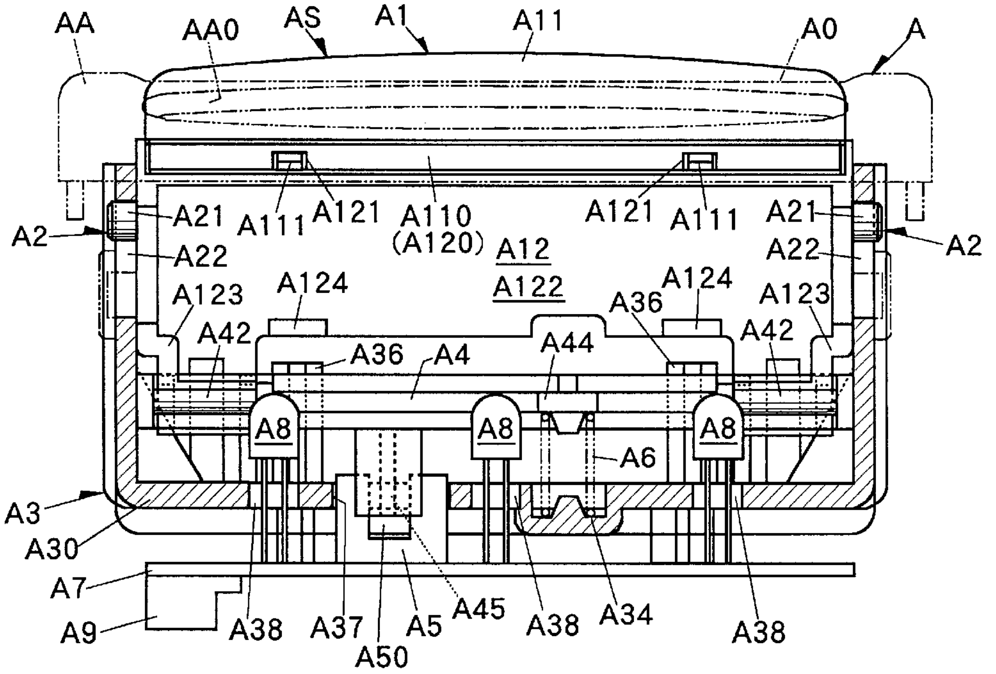
FIG. 6 is a partially sectional front view of the coin-lump insertion part.
Figure 7:
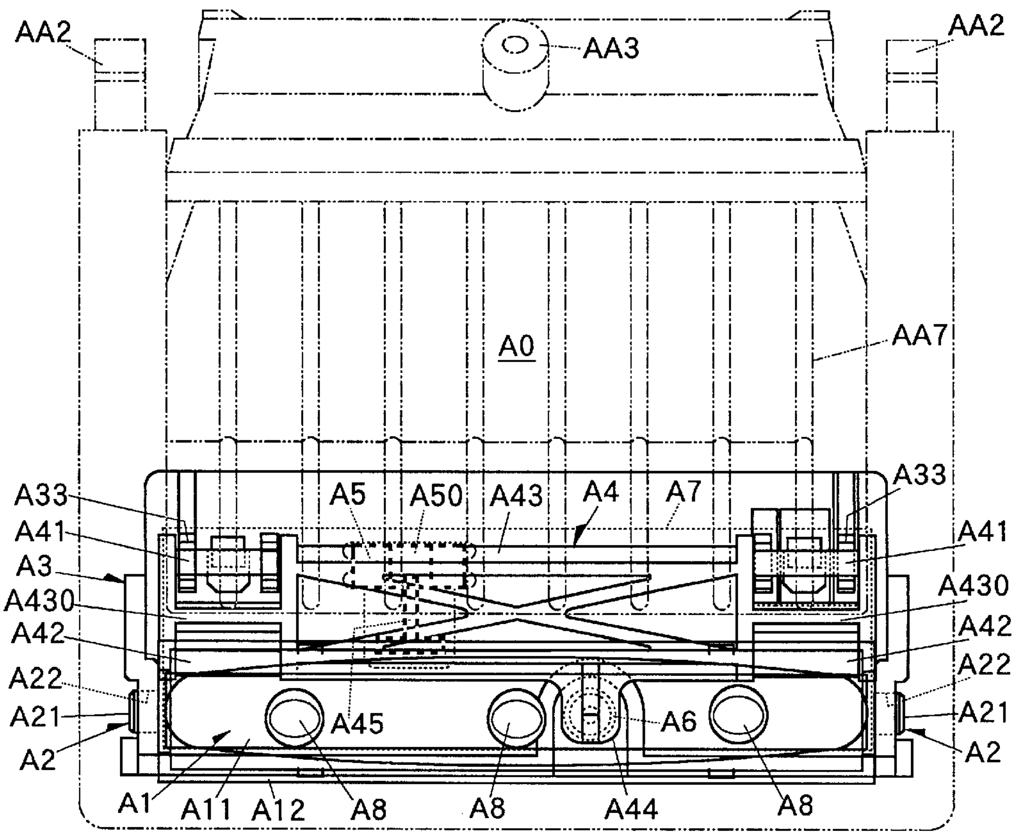
FIG. 7 is a partially perspective plan view of the same.
Figure 8:
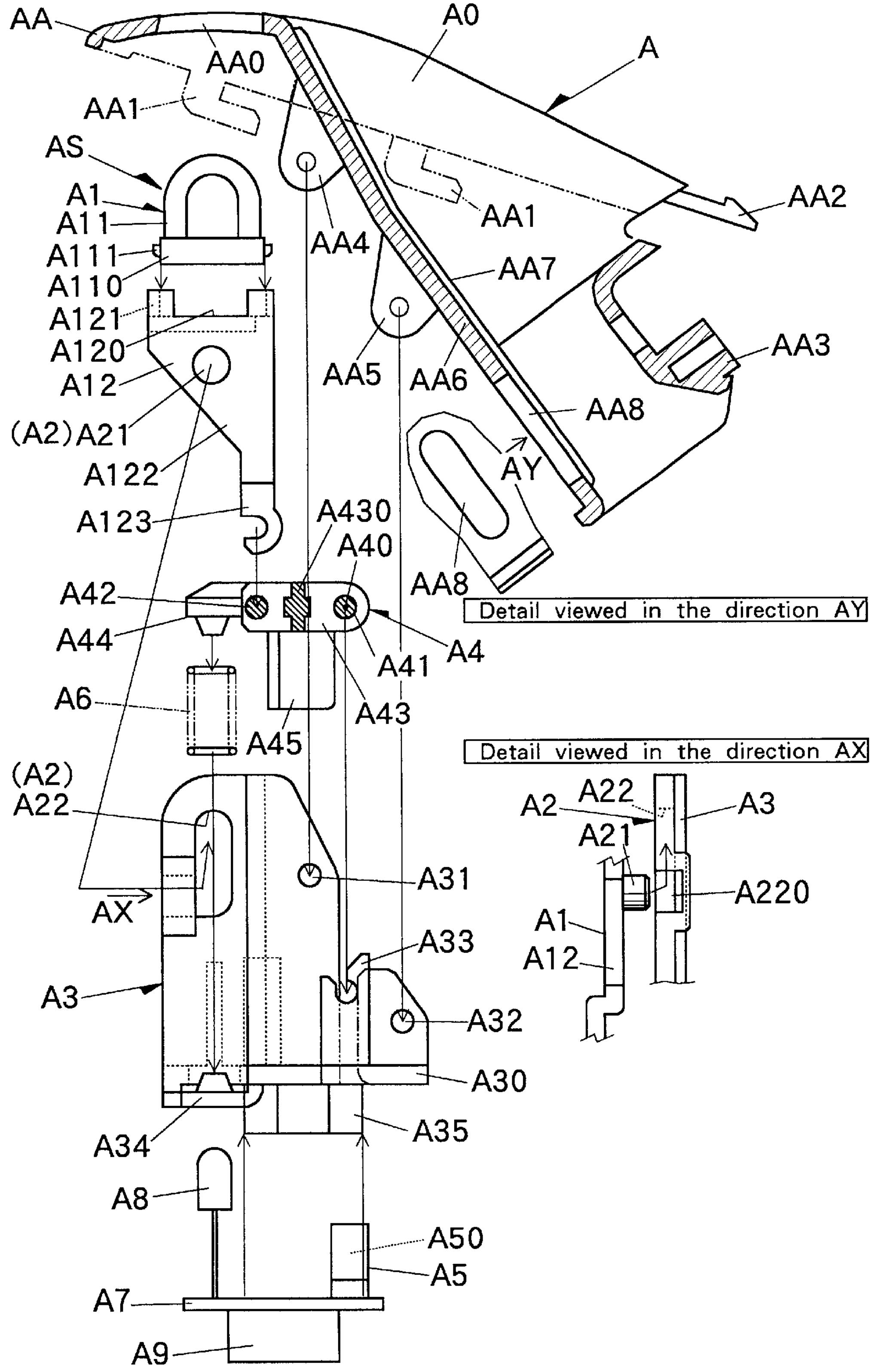
FIG. 8 is an explanatory side view of the coin-lump insertion part in assembly.
Figure 9:
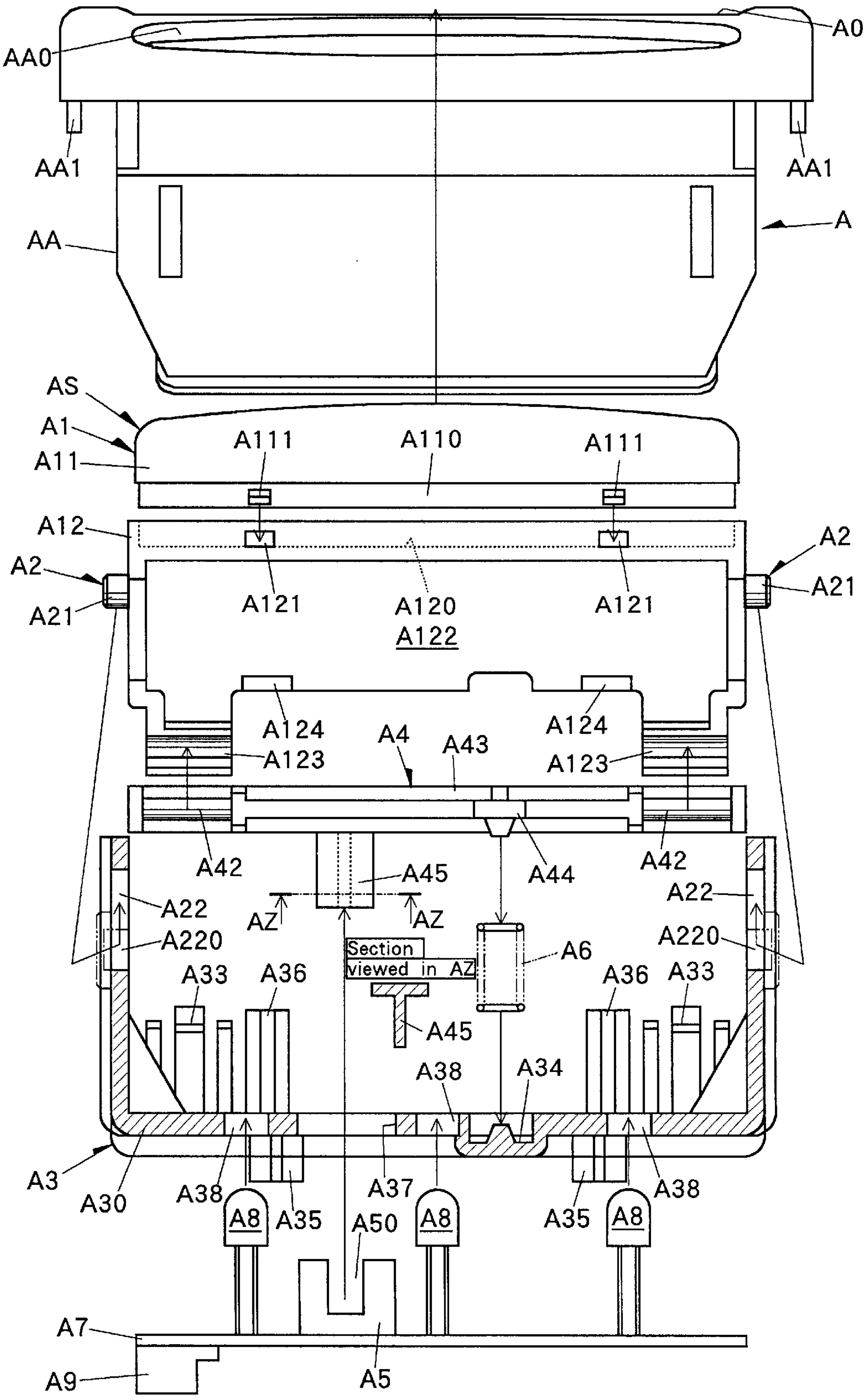
FIG. 9 is an explanatory front view of the same.

The movable control member A1 does, as seen in FIGS. 6 and 7, comprise an elongated member extending along the longitudinal direction of the opening A0 and is provided with a depression element A11 made of a round, elongated and transparent material; and an interlocking element A12 made of a transparent material which has a rectangular recess A120 to receive a rectangular base A110 of the element A11 and a retaining hole A121 to receive a pawl A111, thereby making integral the depression element A11 and interlocking element A12, as shown in FIGS. 8 and 9

The head of the depression element A11 projects outwards from a switch hole AA0 on the assembly AA. The guide member A3 does, as shown in FIG. 6, comprise a switch base body A30 in a U-like shape in the front view and connection parts A31 and A32 connected to respective connecting elements AA4, AA5 which project downwards on the left and right sides of the assembly AA.

Between the movable control member A1 and the guide member A3 is provided a guide means A2 which guides sliding and rotation of the movable control member A1 at both lateral sides of the guide member A3. The guide means A2 comprises pins A21 at both lateral sides of a body A122 of interlocking element A12 forming the movable control member A1, and elongated pin-receiving holes A22 on the left side and right side walls of the switch base body A30 forming the guide member A3. As shown in the Detail indicated by the arrow AX in FIG. 8, the pin A21 is inserted through an opening A220 opening at the lower part of the pin receiving hole A22.

Figure 5:
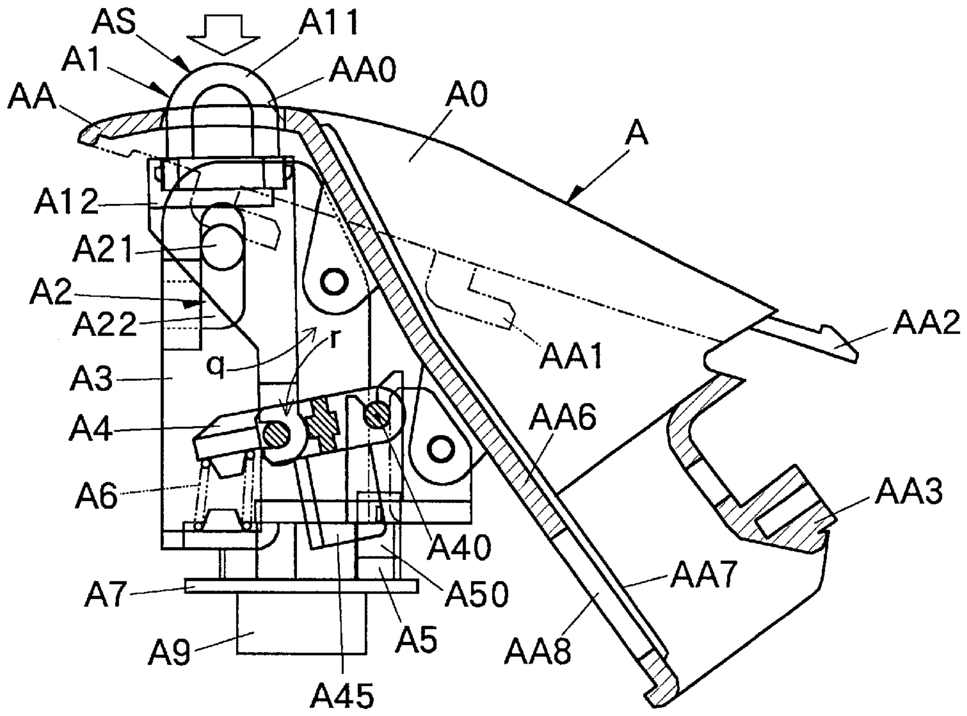
FIG. 5 is a similar side view of the same in operation.

As seen in FIG. 5, between the movable control member A1 and the guide member A3 is provided a swing member A4 which swings in the direction of arrow r following sliding movement of the movable control member A1. The swing member A4 does, as shown in FIG. 7, include integrally a swing axle A41 and a connection axle A42 having a power frame A430 therebetween at both lateral sides of a base A43 having a rectangular shape in a plan view. As seen in FIG. 8, the swing axle A41 is rotatably received by a holder A33 which projects on a bottom wall of the switch base body A30. And a hook A123, which is formed at both lateral sides of the lower end of the interlocking element A12 forming the movable control member A1, is rotatably connected to the connection axle A42 displaced from an axis A40 of the swing axle A41.

Furthermore, as shown in FIG. 8, a return spring A6 using a coiled spring is interposed between spring supports A44 and A34, the spring support A44 being integrally formed at the front of the swing member A4 and the other A34 at the guide member A3.

A mounting seat A35 is integrally formed at the back of the bottom wall of the switch base body A30 and is screwed with an insertion part base plate A7. The base plate A7 mounts on the upper surface a non-contact type detection means A5 comprising a photointerrupter, and three LEDs A8 which lights by switch-on, and on the rear surface a connector A9. As seen in FIG. 9, the switch base body A30 has a hole A37 for the detection means A5 and holes A38 for LEDs A8. The detection means A5 is in a U-like shape opening at the upper end and has a detection path A50 which faces or is positioned on or along a track of a swinging element A45 which is integrally formed at the lower end of the swing member A4; has a T-like cross section; and swings forwards or backwards following the swing of the swing member A4.

As shown in FIG. 9, the switch base body A30 is provided on the upper surface at the bottom wall symmetrically with a pair of slide stoppers A36 which projects to abut against an abutment A124 integrally formed on the interlocking element A12 of the movable control member A1, thereby limiting the stroke of the movable control member A1 to a predetermined range. Furthermore, as seen in FIG. 7, the coin-guide floor AA6 in the assembly AA is provided with a plurality of rails for mitigating friction, and also provided inwardly and in the transverse direction with a plurality of elongated small holes AA8 for removing dust as shown in FIG. 8.

The above feature enables that the depression element A11 employs an elongated member to be improved in controllability and is guided in sliding movement at both lateral sides by the guide means A2 to slide smoothly. The interlocking element A12 can rotate around the pin A21 so that the depression element A11 even when depressed more or less slantwise can be smoothly guided in sliding movement, providing an excellent controllability. Moreover, the interlocking element A12 and swing member

A4 are coupled through the hook A123, there could occur no time lag between operation of the switch and detection by the detection means A5 upon depression of the depression element A11 and its returning through the spring A6, whereby ensuring a sure and dependable operation.

Figure 10:
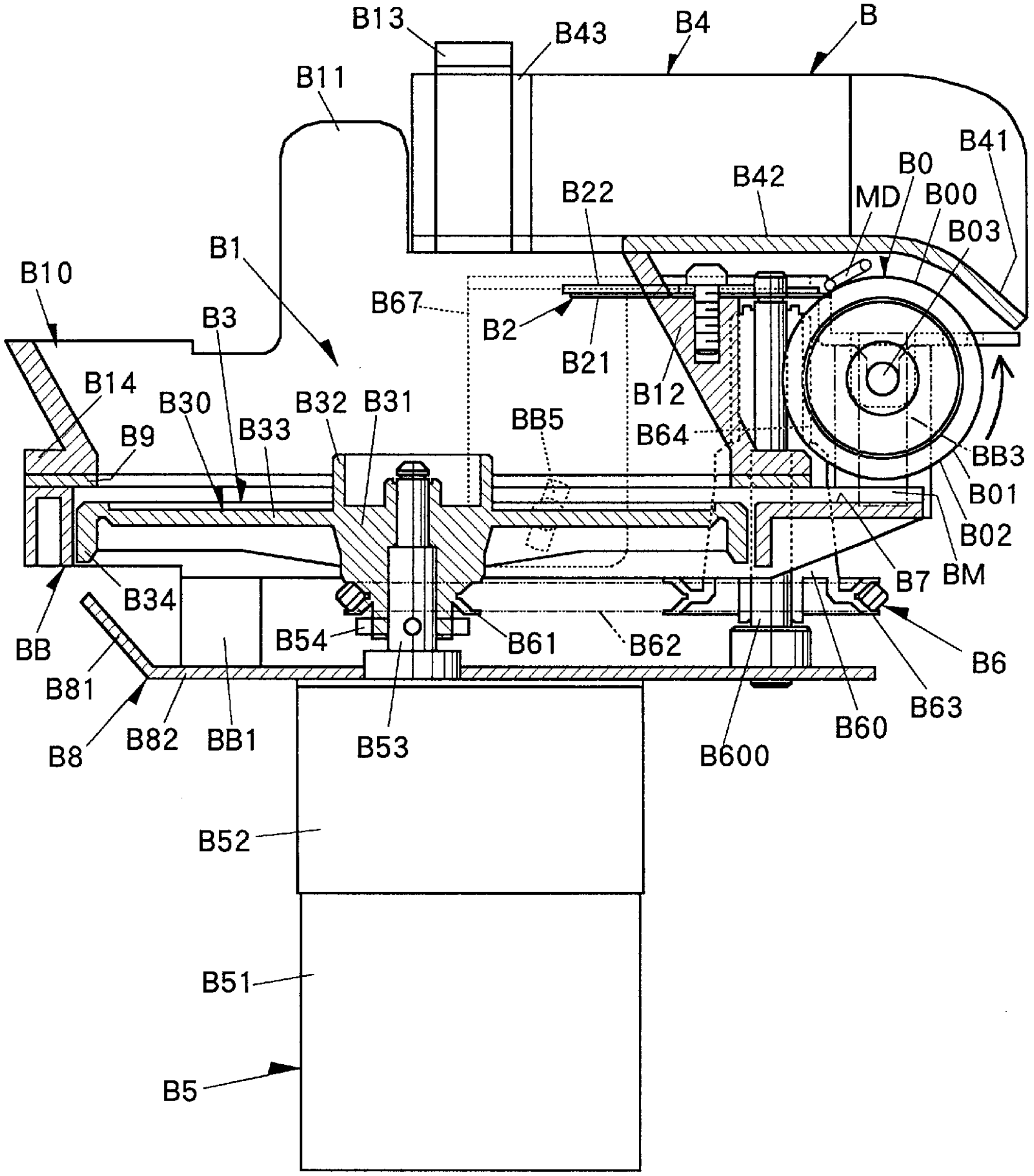
FIG. 10 is a sectional side view of a foreign-objects separator.

Next, the foreign objects separator B will be detailed. The foreign objects separator B does, before the process at the coin-sending device, catch any foreign objects among the inserted things received from the coins-lump insertion part A. The separator B comprises a foreign objects capturing roller B0 with a capturing surface B00 having magnetism attracting metal. A tubular magnet is applied, for example, by adhering, to the outer periphery of a roller shaft B03, thereby providing magnetism. The capturing surface B00 is adpated to face the coin-passage BM in a slit-like configuration allowing substantially one coin to pass through, and forms a foreign objects capturing means B01 and a removing means B02 for catching any foreign objects on the coin-passage and removing them therefrom. The capturing roller B0 rotates in the direction indicated by the arrow in FIG. 10.

Figure 11:
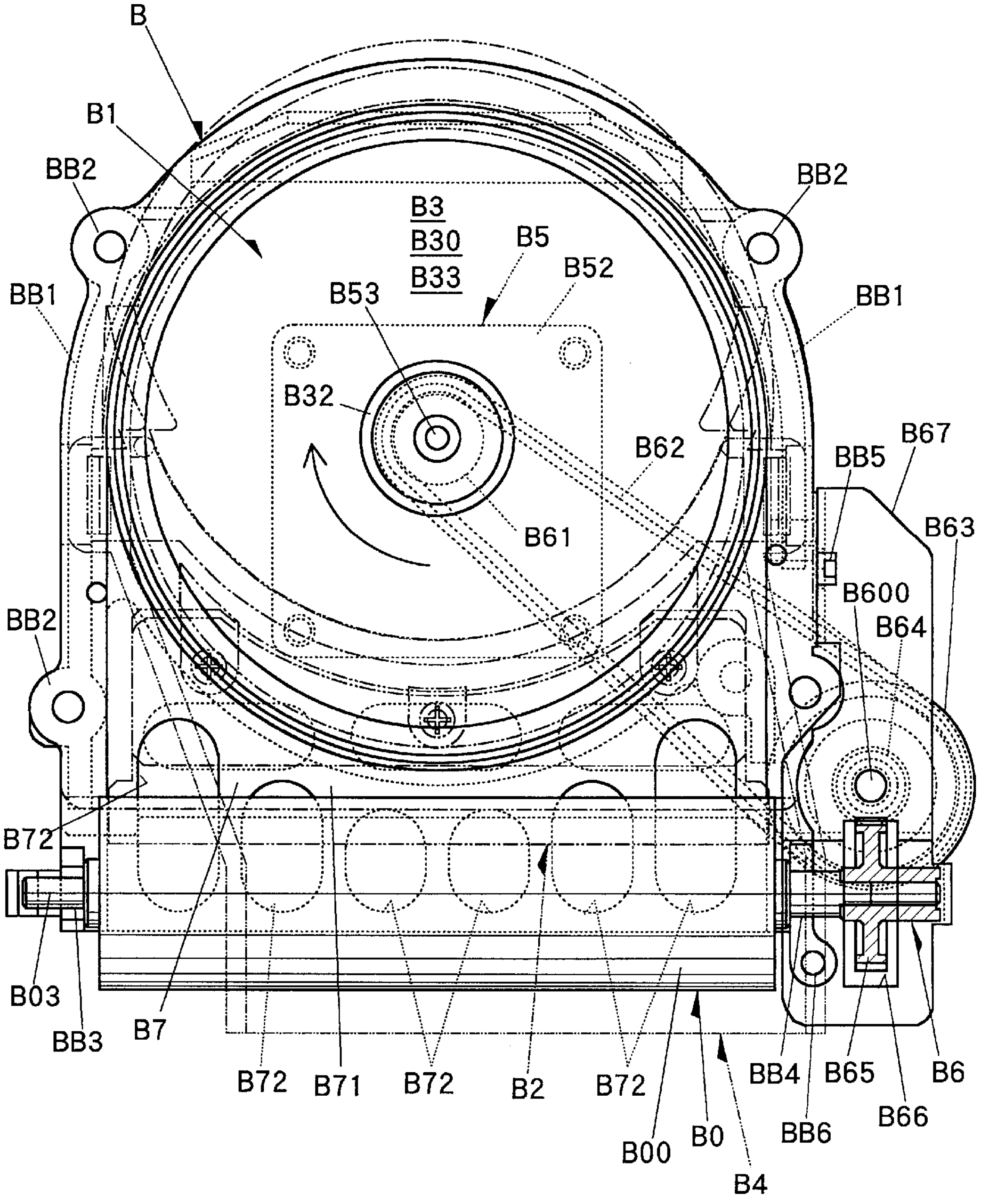
FIG. 11 is a plan view of the same.
Figure 12:
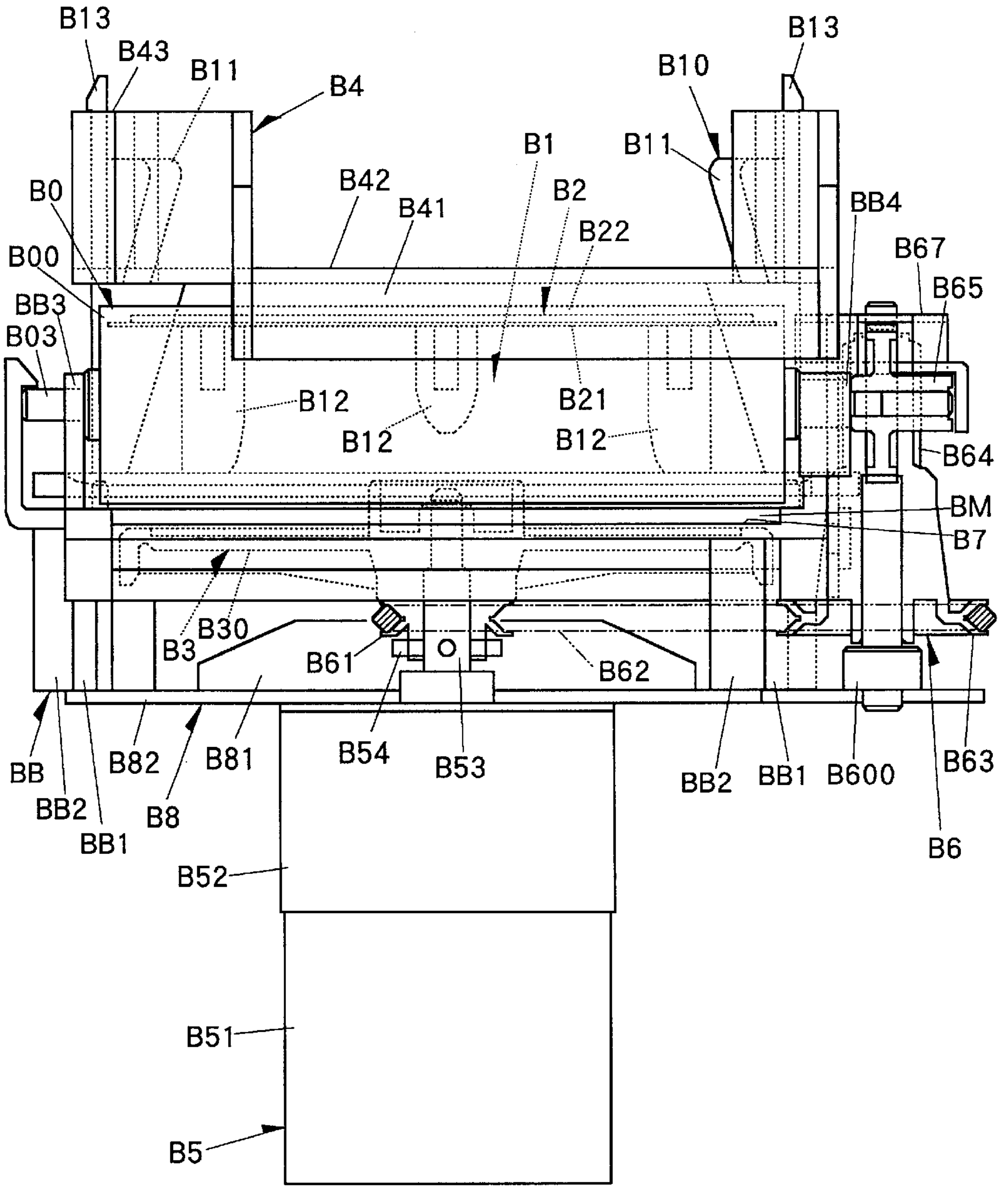
FIG. 12 is a rear view of the same.

Provided before the foreign objects capturing roller B0 are a receiving means B1 for receiving the things inserted in the machine in a lump, and a transfer means B3 for moving the received inserted things in the inside of the receiving means B1. The receiving means B1 is formed inwardly of a backet B10 which is in an almost tubular shape extending slantwise forwardly. The transfer means B3 comprises a turntable B30 which has a rotation axle extending perpendicularly to that of the capturing roller B0 and rotates in the direction indicated by the arrow in FIG. 11.

Figure 13:
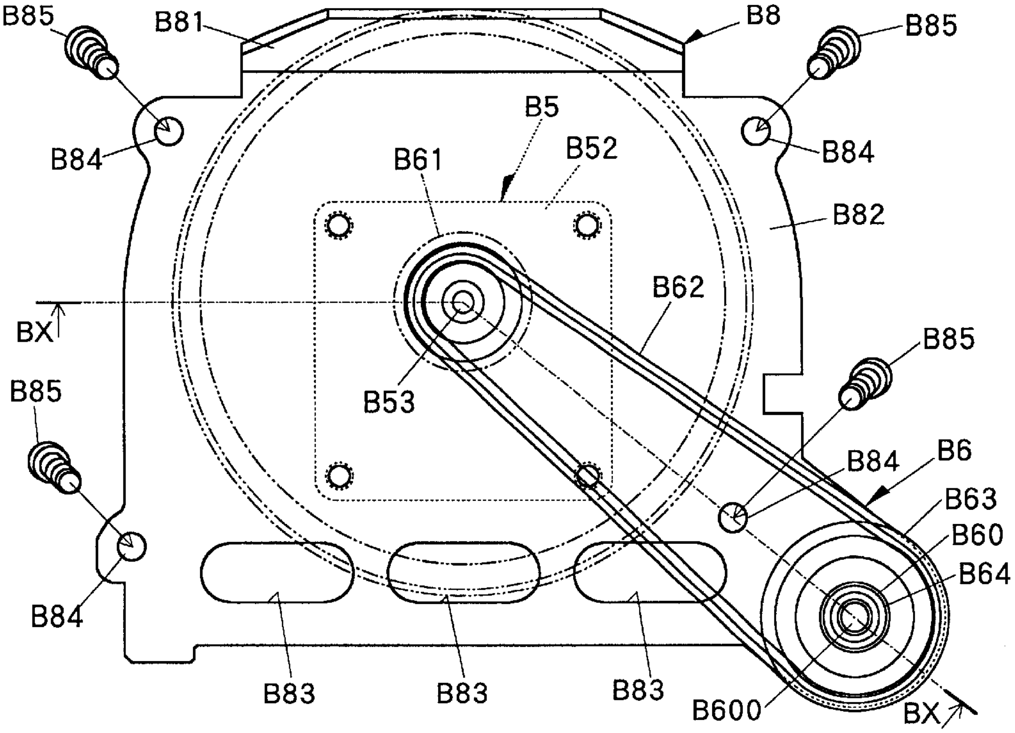
FIG. 13 is a first explanatory plan view of the foreign-objects separator in assembly.
Figure 14:
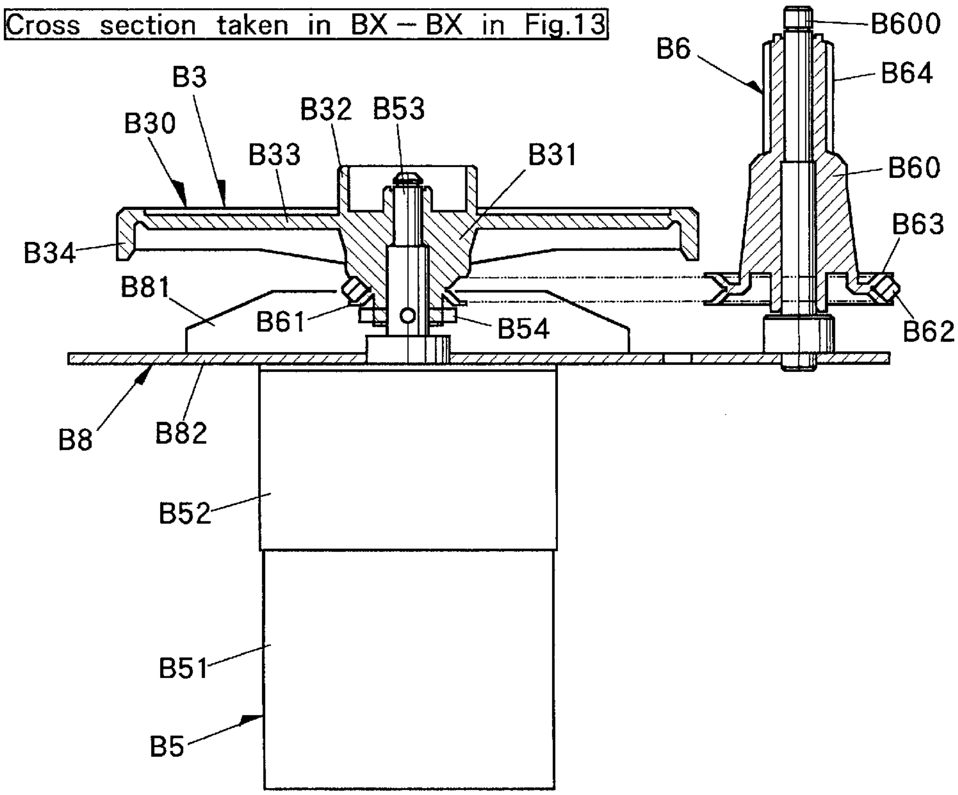
FIG. 14 is a sectional view taken in the line BX—BX in FIG. 13.

As seen in FIGS. 13 and 14, the turntable B30 is connected under the same directly with a drive source B5 by use of a motor base B8. The drive source B5 includes a motor B51 such as a D.C. motor, and a reduction gear B52 having a reduction gear ratio, for example, of 1/10. Reduction output shaft B53 is fit into hub B31 of the turntable B30 and fixed with a locking pin B54. The turntable B30 includes a projecting tubular part B32 extending above the hub, a disc part B33 having a predetermined area, and a peripheral tubular part B34 extending downwards. The motor base B8 comprises a front edge B81 bent upwards, a plate body B82 and holes B83 at the rear end, and is fit onto a base BB1 (FIG. 15) under the main frame BB to be tightened by screws B85 screwed in holes 84 and bosses BB2.

The drive source B5 and foreign objects capturing roller B0 interlock by means of an interlock means B6 arranged at a position kept away from the inserted things. The interlocking means B6 comprises a small diameter pulley B61 integrally formed at the lower part of the hub B31 of the turntable B30, a drive-belt B62, a large diameter pulley B63 of a drive worm B60 rotatably supported on a drive shaft B600, a worm gear B64 of the drive worm B60, and a drive gear B65 comprising a helical gear fit on a roller shaft B03 and meshing with the worm gear B64. The interlocking means B6 is arranged under the turntable B30 and main frame BB, and outwardly of an end surface of the foreign objects capturing roller B0, thereby not interfering with the inserted things.

Figure 15:
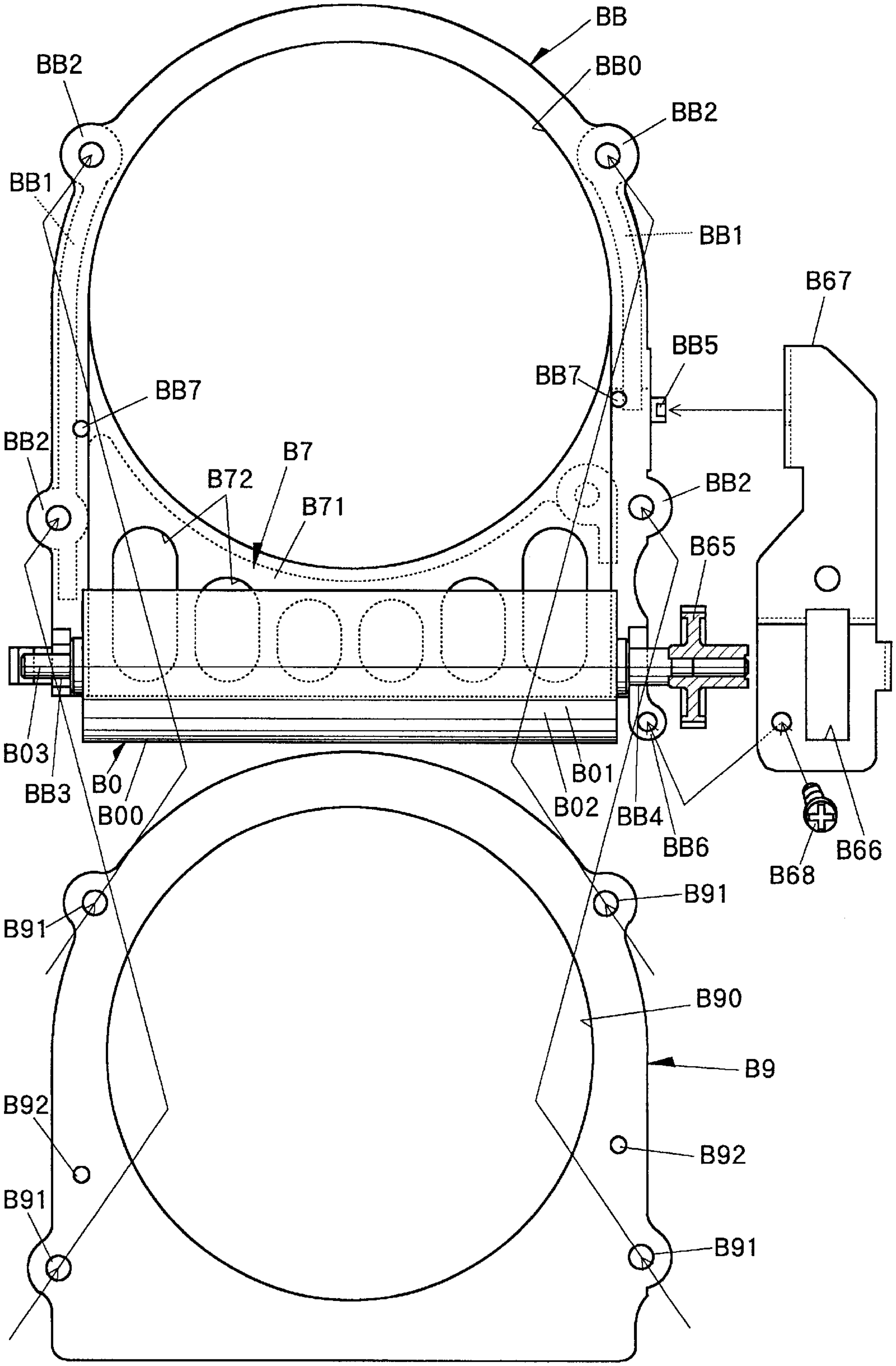
FIG. 15 is a second explanatory plan view of the foreign-objects separator in assembly.

As seen in FIG. 15, the main frame BB has at its central part a hole BB0 for the turntable B30 and is provided at the rear side with bearings BB3, BB4 for the shaft of the capturing roller B0. A coin-guide floor B7 is formed adjacent to the receiving hole BB0 which connects the turntable B30 with the capturing roller B0. The coin-guide floor B7 includes a coin-support B71 having a plurality of or various openings B72 which have widths smaller than diameter(s) of coin(s), so that smaller foreign objects, liquid and so on not subjected to capturing by the capturing roller B0 are caused to fall from the openings B72 and be discharged to a cancelling chute 92 through an overflow guide C6 provided in the coin-sending device C as shown in FIG. 3.

Figure 16:
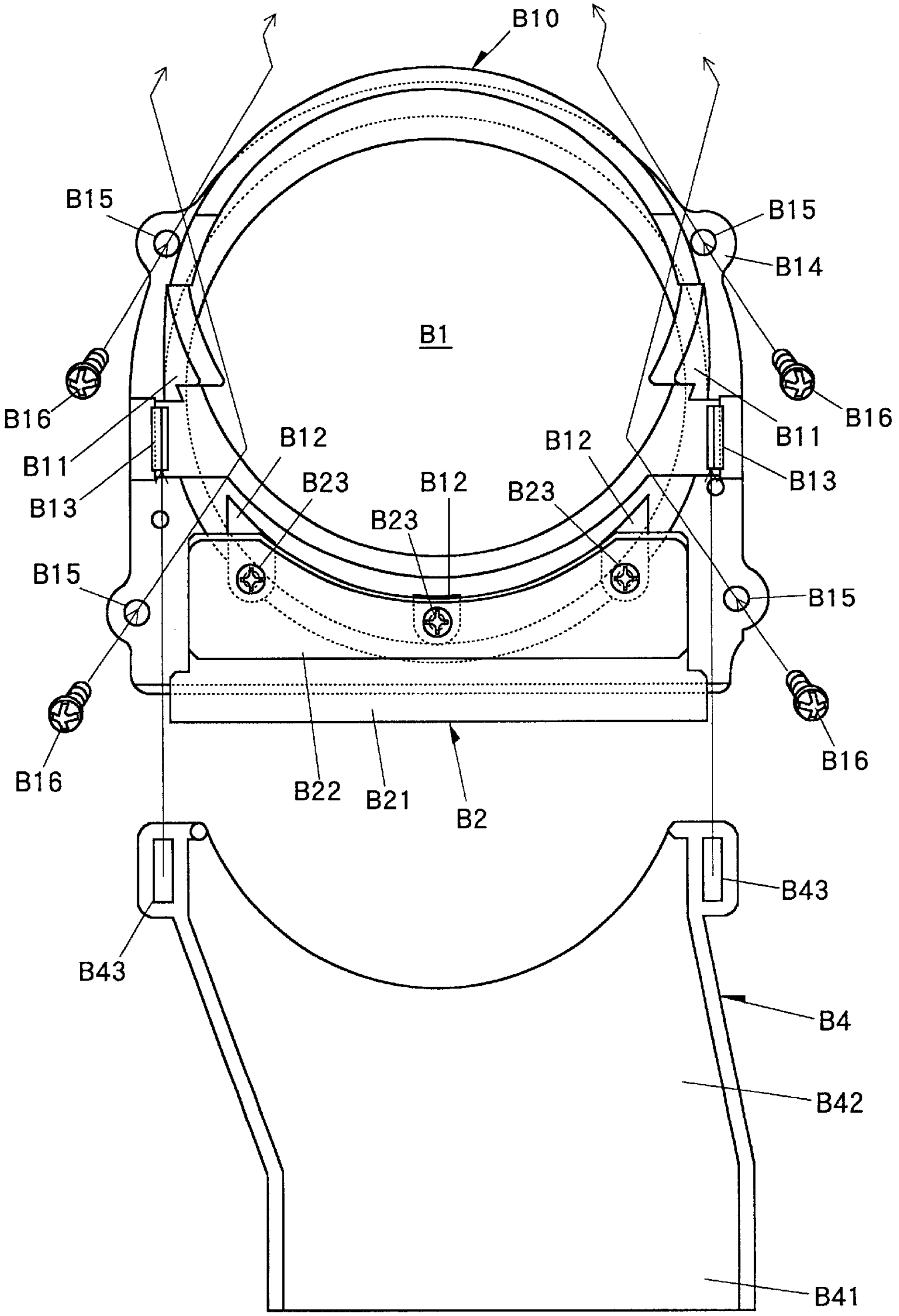
FIG. 16 is a third explanatory plan view of the same.

The main frame BB retains at the side of drive gear B65 a gear support means B67 (which has a hole B66 in which the drive gear B65 rotates) by engaging the support means B67 with a side ratch BB5 and screwing a screw B68 with a rear end screw boss BB6. Moreover, a bucket B10 shown in FIG. 16 is mounted on the main frame BB interposing therebetween a liner plate B9 which has a central bore B90 slightly smaller in diameter than the receiving bore BB0, and screw holes B91 and positioning holes B92 corresponding to the screw bosses BB2 and upper end positioning pins BB7 respectively.

The bucket B10 is provided integrally at both lateral sides at the upper part with an anti-leakage supporter B11. A carry-prevention means B2, which prevents any foreign objects caught by the capturing roller B0 from rotating with the same, is tightened at the three mounting seats B12 by use of screws B23. The carry-prevention means B2 comprises a thin selector sheet B21, which contacts with the capturing surface B00 at a position away from the coin-passage, and a sheet base B22 for holding the mounting base of the selector sheet.

Mounted above the bucket B10 is an overflow chute B4 which allows the inserted things overflowing the receiving means B1 to bypass the foreign objects capturing roller B0 and be introduced toward the coin-sending device. The chute B4 has a slide B42 including a steep slope B41 at the downstream side and engages a pair of pawl-receiving holes B43 with pawls B13 on the bucket B10.

The bucket B10 is mounted to the main frame BB by screwing screws B16 with thread bores B15 at a flange B14 and thread bosses BB2 on the main frame BB (FIG. 15). Furthermore, as shown in FIG. 3, the whole of the foreign objects separator B is backwards downwards slantwise installed so that the intermediate or mutually adjoining part between the turntable B30 and the capturing roller B0 is placed low and slanted backwards downwards about 25°.

According to the above features, namely, rotation of the turntable B30; prevention of foreign objects from being carried rotated; and installation of the separator as being slanted backwards downwards, the inserted things received from the coins-lump insertion part A into the bucket B10 can be properly handled and moved to be smoothly directed to the foreign objects capturing roller B0, so that regular or true coins are transferred smoothly to the following coin-sending device C while metal foreign objects MD such as paper clips, wire, nails, keys, counterfit metal coins or the like (see FIG. 10) are caught excellently by the capturing surface B00 on the capturing roller B0 to be held at the separator sheet B21 placed away from the coin-passage and be effectively prevented from flowing to the coin-sending device C.

Figure 17:
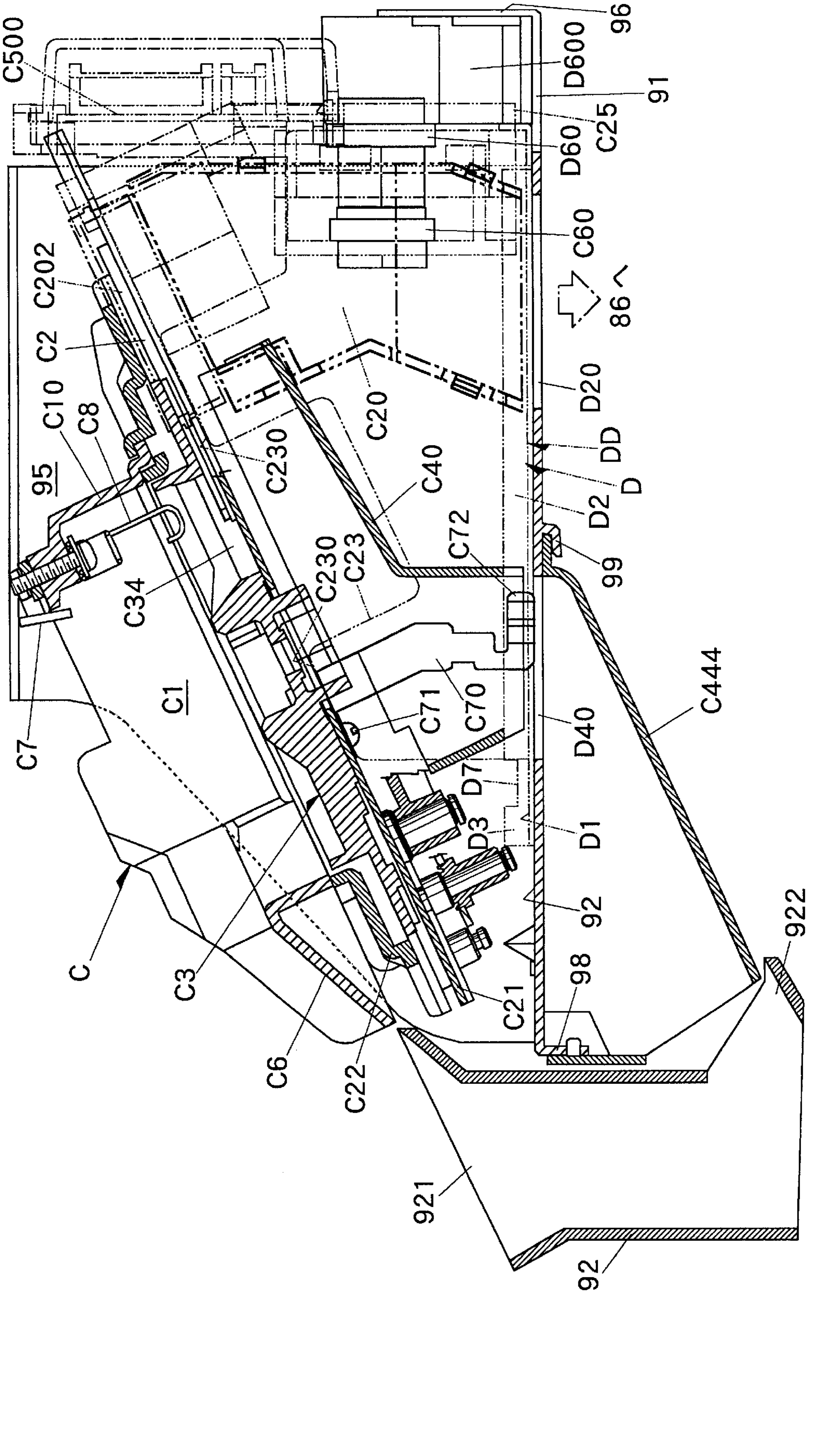
FIG. 17 is a partially sectional side view of a coin-sending device.
Figure 18:
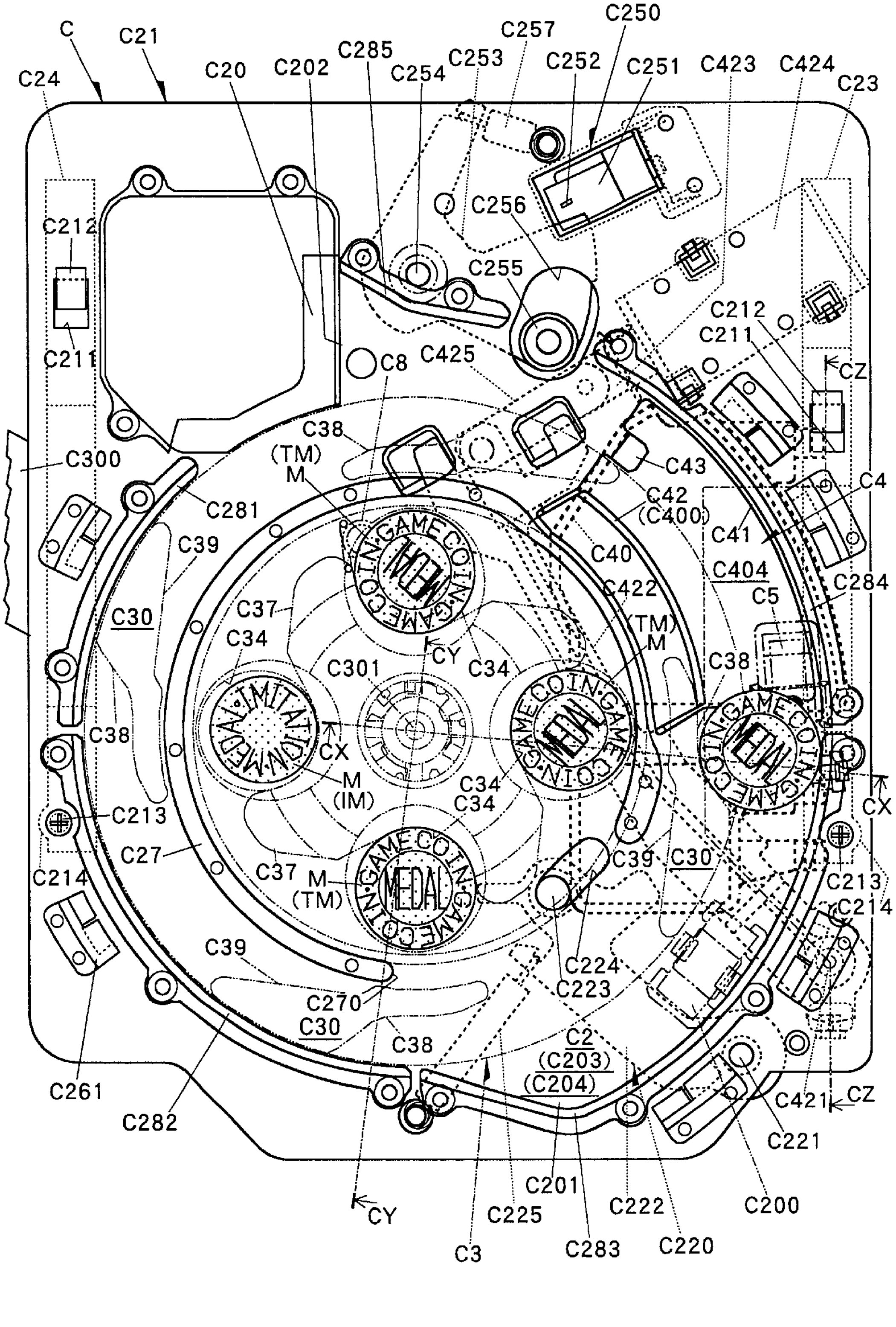
FIG. 18 is a plan view of the same.

Next, the coin-sending device will be detailed. The coin-sending device C does, as shown in FIGS. 17 and 18, receive coins from the foregoing coins-lump insertion part A and foreign objects separator B and store the coins in a first reservoir C1 formed inwardly of a hopper bucket C10. The stored coins are sent sequentially one by one to a second-side passage C2 by driving a rotary disc C3 to be subjected to separation of true and false coins by a coin separation part C4. True coins TM are then counted by a true-coins detector C250 and taken into a coin payout hopper 86 from an outlet C202 of the second-side passage C2 through a duct-like outlet passage C20. False coins IM are discharged to an inlet 922 on the middle of the cancel chute 92 from a removal opening C404 at the coin separation part 04 through a removal passage C40 in a substantially L-like box shape extending forwards along the rear side of the rotary disc C3, and an intervening passage C444 communicating the removal passage C40.

As seen in FIGS. 19 to 22, the rotary disc C3 is interposed or sandwiched between a main base C21 and a top cover C22 layered thereon. Outer pawls C262 of the top cover C22 (FIGS. 22 and 23) are received (following turn of the top cover) into the innermost of pawl receiving parts C261 on the main base C21, and a mounting element C264 on the top cover C22 aligned with a thread hole C263 at the main base C21 is screwed.

Figure 21:
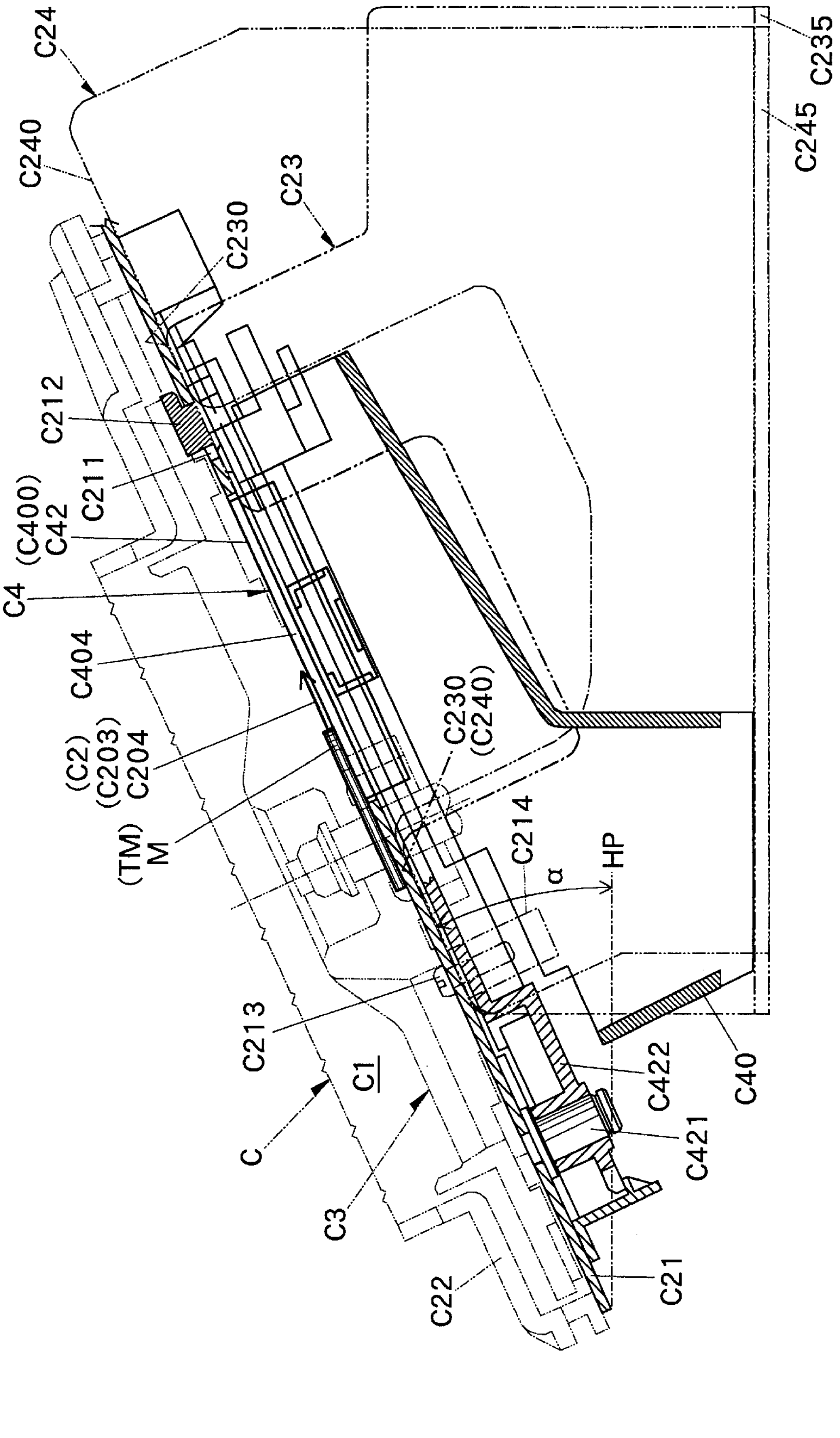
FIG. 21 is an enlarged sectional view taken in the line CZ—CZ in FIG. 18.

As seen in FIG. 21, the whole assembly of the rotary disc C3, main base C21 and top cover C22 is supported by right and left side stands C23 and C24 which have on the top a slanted mounting part C230, C240 at the front and rear parts slanting backward upwards and are retained by engaging a L-like hook C212 in a receiving hole C211 on the main base C21 and screwing a screw C213 with a boss C214. The whole assembly is installed slantwise with the front part being set low so that the first side reservoir C1 faces toward the coins-lump insertion part A on the upper surface of the rotary disc C3. The slant angle $\alpha$ to a horizontal plane HP is about 25°.

The coin separation part 04 is formed on an uphill slope C204 on the second-side passage C2. An outlet C202 of the second-side passage C2 opens in the region extending backward upwards as shown in FIG. 17. The right and left side stands C23, C24 are connected to each other at their rear part by use of a rear stand C25.

Figure 22:
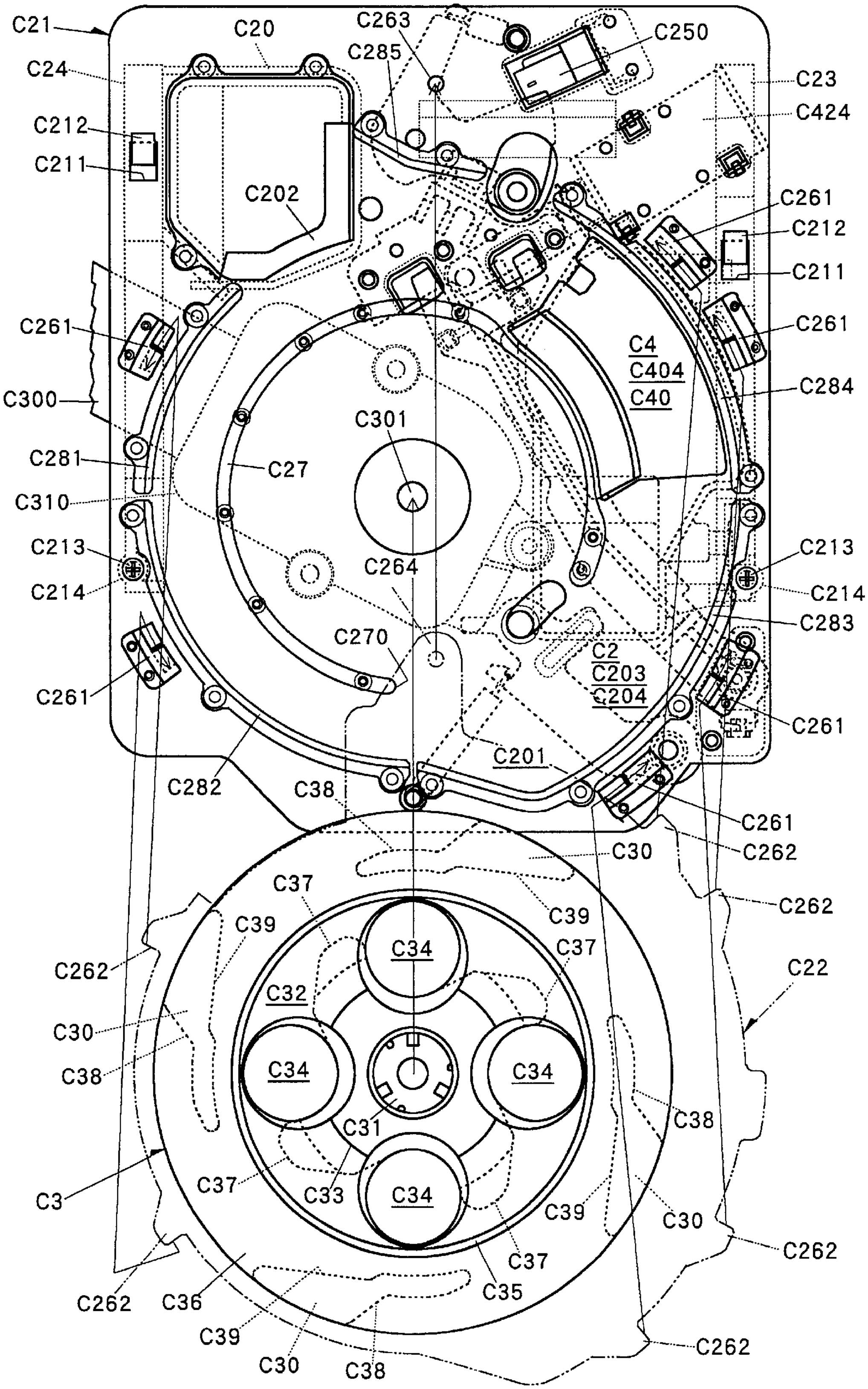
FIG. 22 is a first explanatory plan view of the coin-sending device in assembly.

As seen in FIG. 22, a coin guide C27 is mounted on the main base C21 correspondingly to a predetermined position of the lower surface of the rotary disc C3 and extends in the peripheral direction except a coin-outlet C270 to the second-side passage C2. A plurality of coin supporter guides C281–C285 are mounted around or at the outside of the rotary disc C3 and second-side passage C2.

The rotary disc C3 is driven by an output shaft C301 of a drive means comprising a motor C300 using D.C. motor and a reduction gear C310. The rotary disc C3 includes a boss C31 connected to the output shaft C301, a disc body C32, a coin guide means C33 in a truncated conical shape swelling upwards centrally of the disc body C32, four coin-holes C34 around the coin guide means C33, a tubular guide C35 projecting toward the first-side reservoir C1 an annular flange C36 which is almost flat and extends on the outer periphery of the disc C3, four coin-sending means C37 which project on the rear surface of the disc C3 and are disposed between adjacent holes C34, and four coin-transfer means C30 which project on the same rear surface and are apart from the coin-sending means C37 at a predetermined phase difference. The rotary disc C3 is entirely formed by integral molding using synthetic resin such as polyacetal. The number of rotation of the rotary disc C3 may be several dozens to several hundreds rpm, for example, about 70 rpm.

As shown in FIG. 18, a coin sent to the second-side passage C2 is received by the coin transfer means C30 at its front part C38 (which is narrowed or concaved) to be guided and transferred on the second-side passage C2. A forcible-transfer passage C203 in which the transfer means C30 exerts a transfer-force on coins occupies the entire area of the uphill slope C204 from an inlet C201 to an outlet C202 of the second-side passage C2.

A coin-separation part C4 is provided on the way of the uphill slope C204 and discriminates true coins TM and false coins IM smaller in diameter. The coin separation part C4 is provided with a coin-removal opening C404 slightly smaller in width than the diameter of true coins TM, a first coin-supporter C41, which includes a narrow coin-supporting part positioned at the outer side of the coin-separation part C4, a second coin-supporter C42, which forms a movable member C400 positioned inwardly, the coin-supporters C41 and C42 facing the coin-removal opening C404, and a coin-scoop means C43 disposed at the end of the coin-removal opening C404 and extending downwards at an angle of about 10 from a plane of the main base C21. The second coin supporter C42 is mounted to a swing member C422, which is swung around a fulcrum C421 by use of a connection link C425 and a drive means C424 of solenoid type having a rod C423 movable forward and backward according to electricity turned on and off, so that the normal coin-separation state (FIG. 18) and the all coins retrieval state (FIG. 32) described later can be switched.

Figure 19:
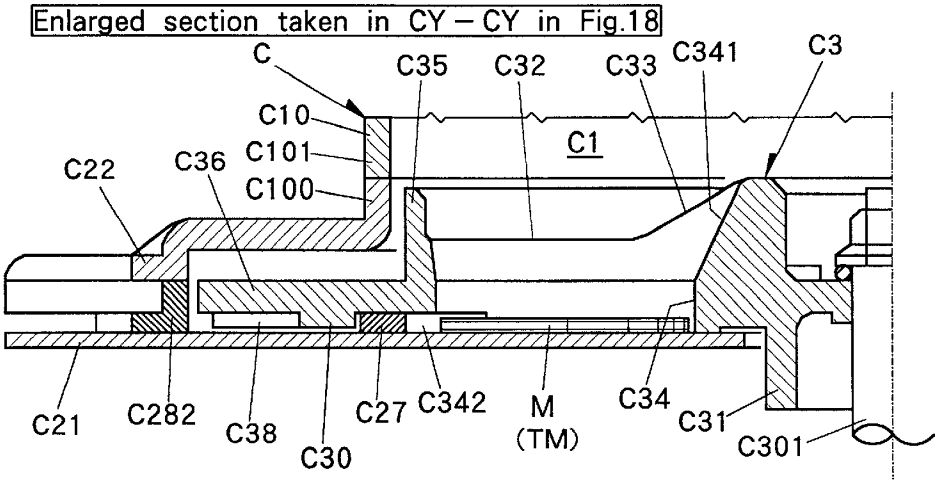
FIG. 19 is an enlarged sectional view taken in the line CY—CY in FIG. 18.
Figure 20:
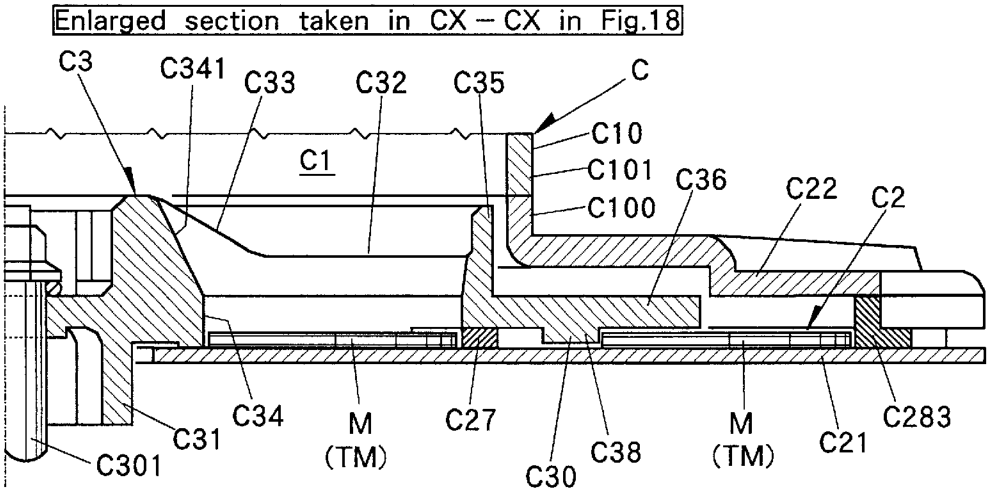
FIG. 20 is an enlarged sectional view taken in the line CX—CX in FIG. 18.

As seen in FIG. 19, any coins larger in diameter than the normal true coins TM do not fall through a tapered part C341 formed at the inlet side of the coin-holes C34 to thereby be expelled at the inlet part. Also, any coins larger in thickness than the true coins TM when fall in the hole C34 cannot pass a coin-releasing point C342 near the hole C34 to be removed at the outlet part of the hole C34. In any case, larger non-standardized coins are not sent to the second-side of the rotary disc C3. The coin holes C34 have the same function as that provided by the feature that the opening slit of the conventional one-by-one insertion is set in size according to standardized coins.

Figure 23:
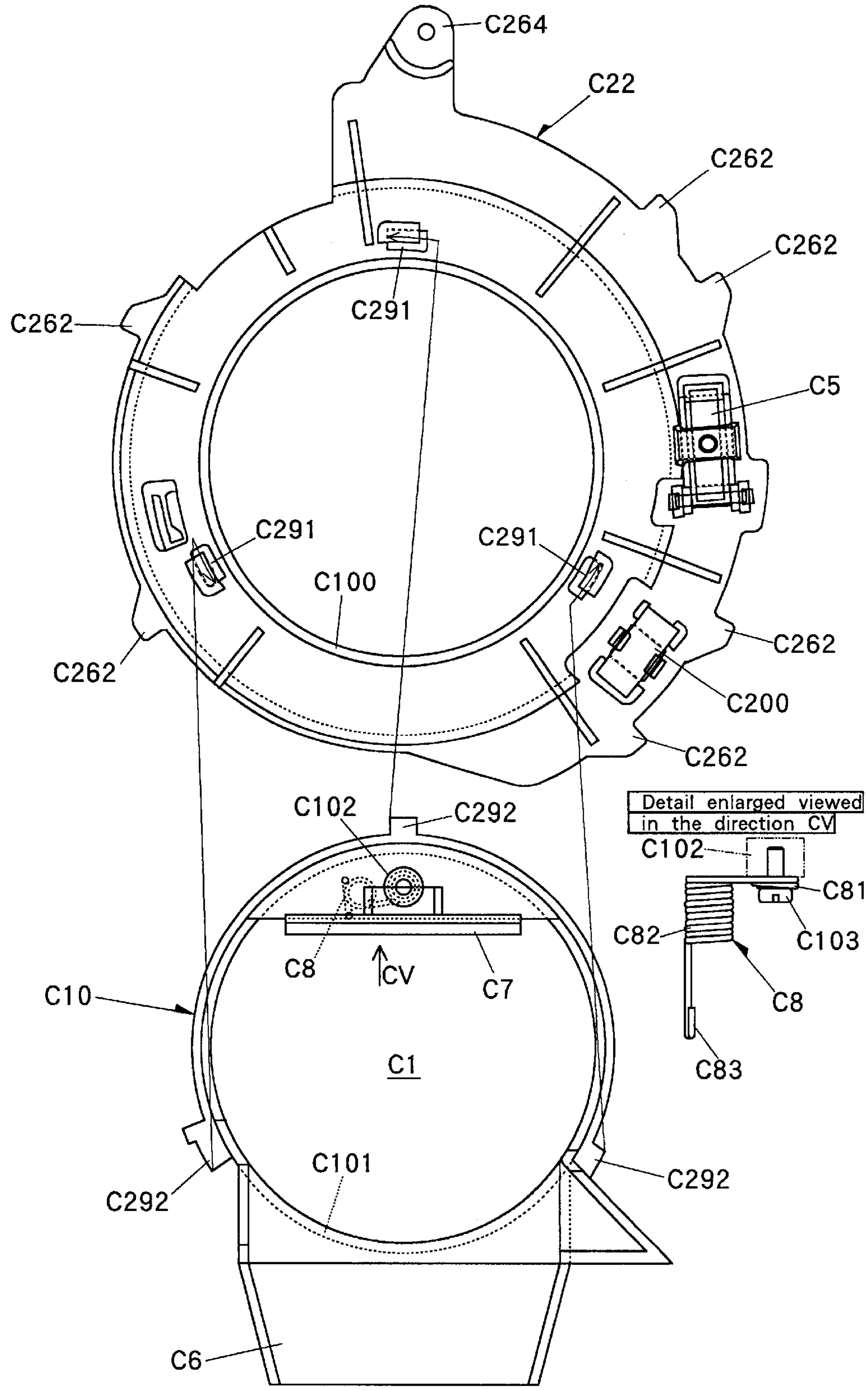
FIG. 23 is a second explanatory view of the same in assembly.

As seen in FIG. 23, a cylindrical part C101 of a hopper bucket C10 is fit (being turned) onto an upper tubular part C100 of the top cover C22 with a fitting pawl C292 being engaged into the innermost of a pawl receiving part C291. The top cover C22 supports a coin sensor C200 which comprises, for example, a reflection type photo-sensor for detecting coins sent from the rotary disc C3 to the second-side passage C2 and not yet introduced to the coin-separation part C4, and a behaviour stabilizing means C5 for stabilizing behaviour of coins being about to enter the coin separation part C4.

Furthermore, an overflow guide C6 is integrally formed at the front of the hopper bucket C10 for causing coins (when excessively placed in the first-side reservoir C1) to overflow forwardly downwards and be discharged into a wide inlet 921 at the uppermost of the cancel chute 92.

The foregoing mirror C7 is mounted above a mounting seat C102 at the back of the hopper bucket C10, and provided under the mounting seat C102 is an assist means C8 which interferes coins stored in the first-side reservoir C1 to assist taking coins to the rotary disc C3. The assist means C8 comprises an elastic member made of a damper spring having a small wound part C81 for screwing to the mounting seat C102 with a screw C103, a body wound part C82 having separate looping in a plan view, and a hook C83.

Figure 24:
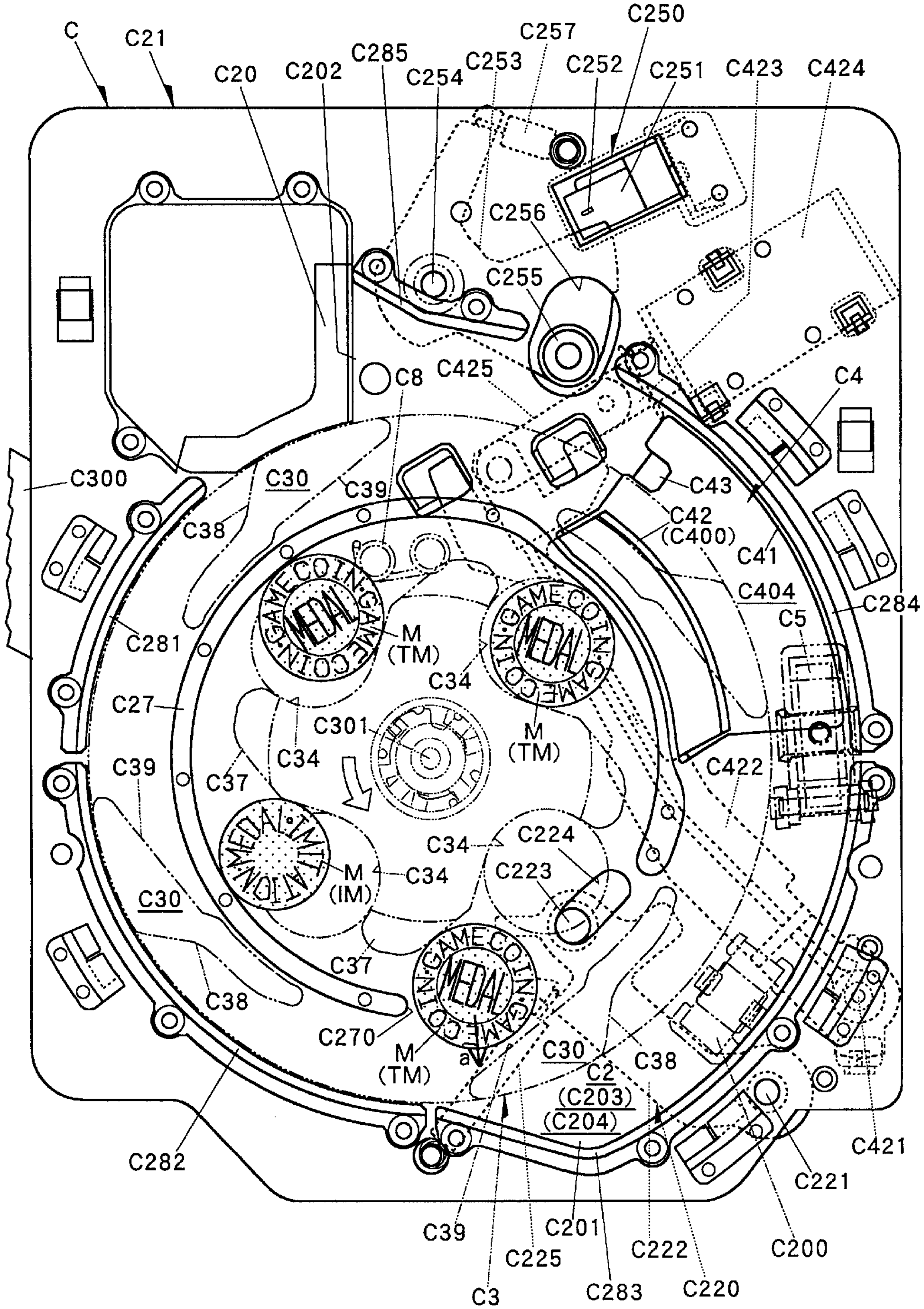
FIG. 24 is a first explanatory view of operation of the coin-sending device.

As illustrated in FIG. 24, when the rotary disc C3 rotates counterclockwise (indicated by the hollow arrow), each coin M which has fallen in the hole C34 to the bottom shifts slightly outwards from the hole to abut against the inner periphery of the coin guide C27 and be transferred by the coin-sending means C37. The coin when reaches the coin-releasing point C270, at which the coin guide C27 terminates, is released in the direction indicated by the solid line a by a centrifugal force to the second-side passage 2. Releasing the coin M is smooth since the plane on which the coin is transferred along the coin guide C27 is level with the plane of the second-side passage C2. The coin-transfer means C30 has at its rear side a narrow concaved part C39 by which the coin M is guided to the second-side passage C2 without being prevented from being sent from the rotary disc C3.

Figure 25:
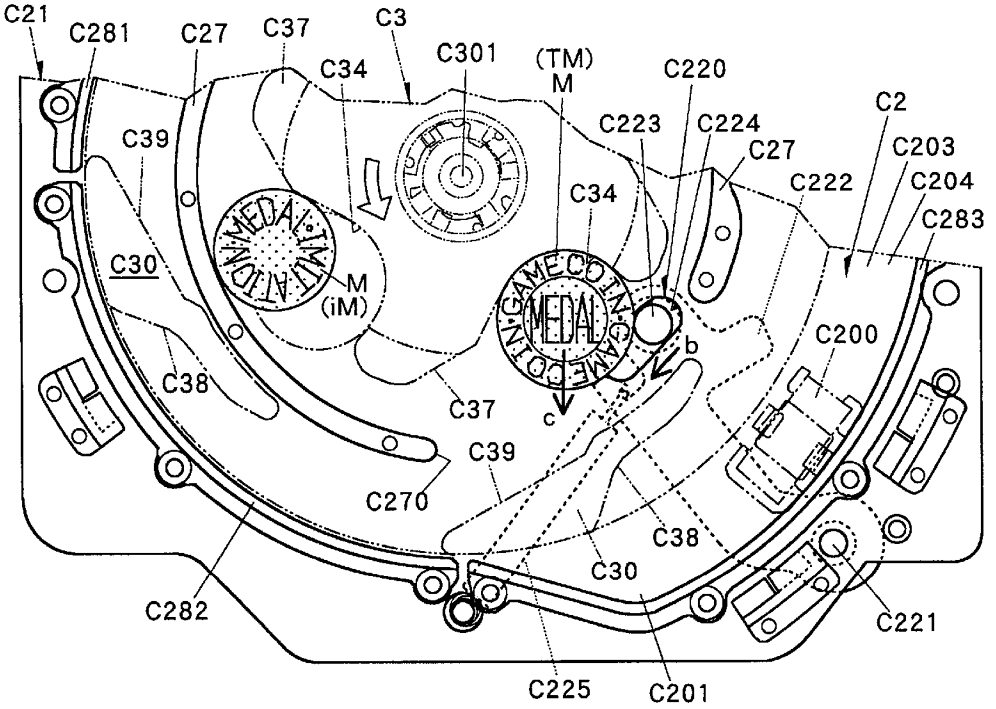
FIG. 25 is a second explanatory view of operation of the same.

As shown in FIG. 25, a coin M which did not shift from the bottom of the hole C34 outwards to the coin guide C27 and has been carried by the coin-sending means C37 as illustrated can be helped going out by an anti-lock mechanism C220 formed near the end of the coin-sending point C270. In detail, the anti-lock mechanism C220 comprises a fulcrum C221, a swing member C222 swingable around the fulcrum, a pin C223 projecting on the swing member, an elongate hole C224 for the pin C223 and a spring C225 for biasing the swing member. The antilock mechanism causes a stagnated coin M to be brought into contact with the pin C223 so that the pin's counterclockwise restoring force (indicated by the arrow b) causes the coin M to escape from the coin-sending means C37 outwards (indicated by the arrow c).

Figure 26:
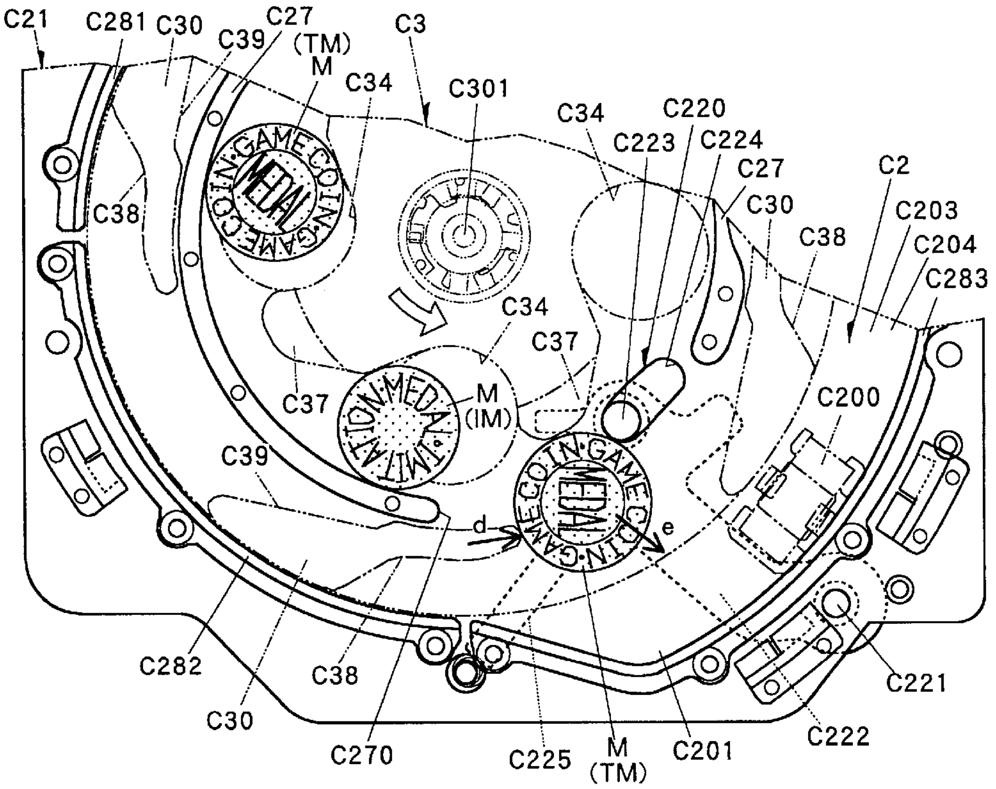
FIG. 26 is a third explanatory view of operation of the same.

In case that a coin M is not sufficiently away from the coin-releasing point C270 and stops on the way as shown in FIG. 26, one end of the coin-transfer means C30 flicks the coin M circumferentially (indicated by the arrow d), causing the coin M to be sent outwards (indicated by the arrow e) without returning inwardly due to hindering by the coin-sending means C37 and pin C223 of the anti-lock mechanism C220.

Figure 27:
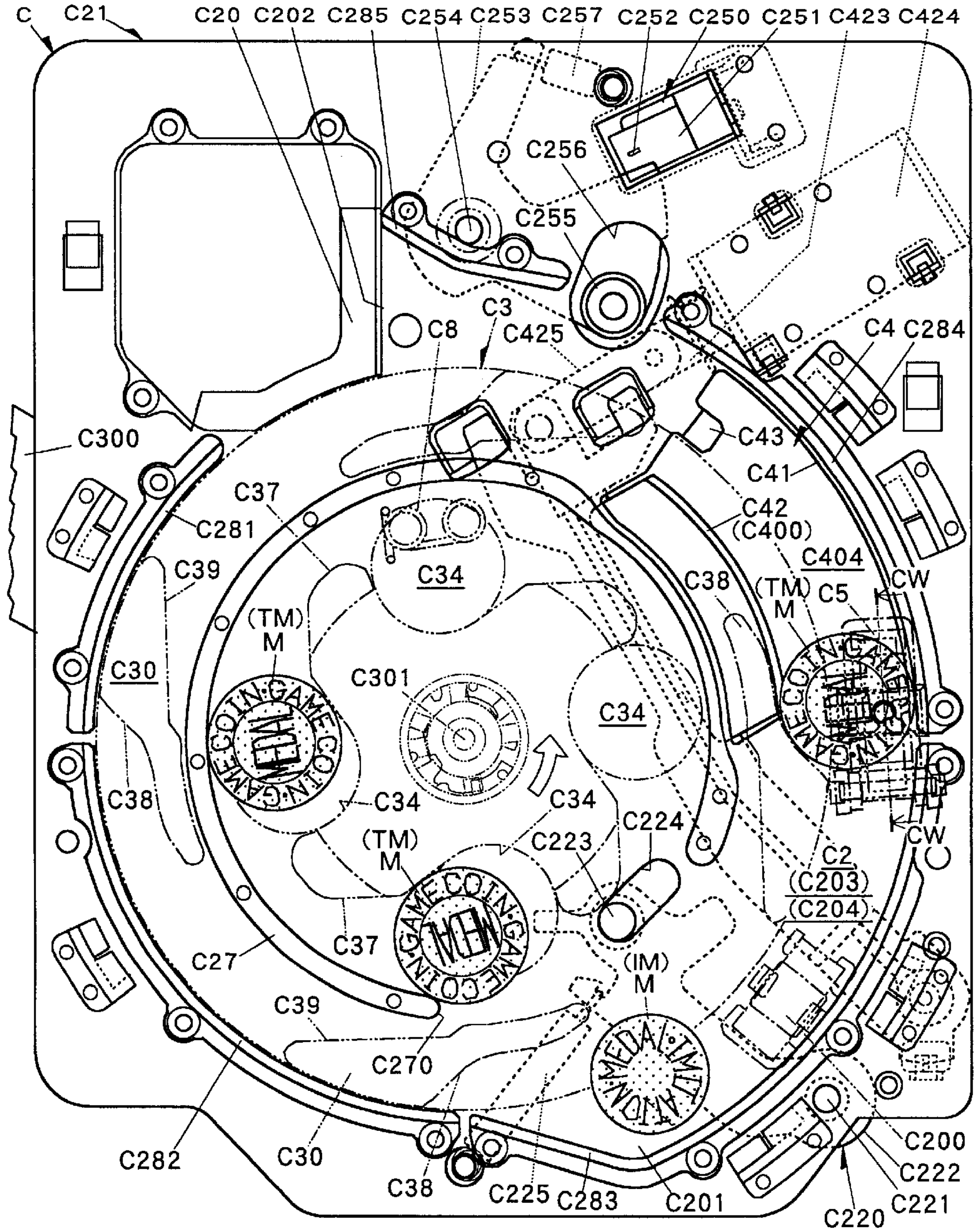
FIG. 27 is a fourth explanatory view of operation of the same.

FIG. 27 shows the coin M sent to the second-side passage C2 and forcibly transferred by the coin-transfer means C30. T h e coin M passing the coin sensor C200 is detected by the sensor and then enters the coin separation part C4.

Figure 28:
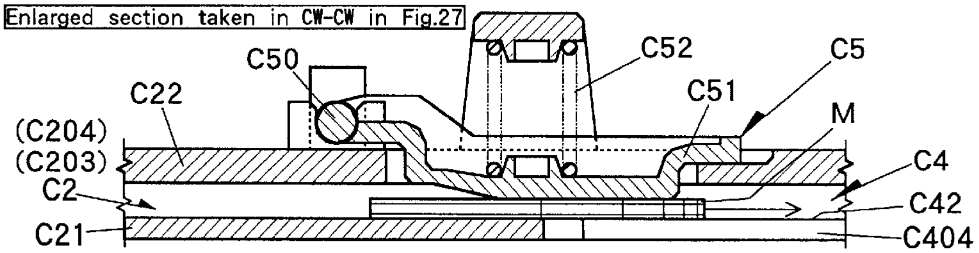
FIG. 28 is an enlarged sectional view taken in the line CW—CW in FIG. 27.

As seen in FIG. 28, the coin M at the coin separation part C4 is properly pushed from above by the behaviour stabilizing means C5, which comprises a lever element C51 swingable around a lever shaft C50 and a biasing spring C52 for the lever element, so that the coin can be stabilized in behaviour.

Figure 29:
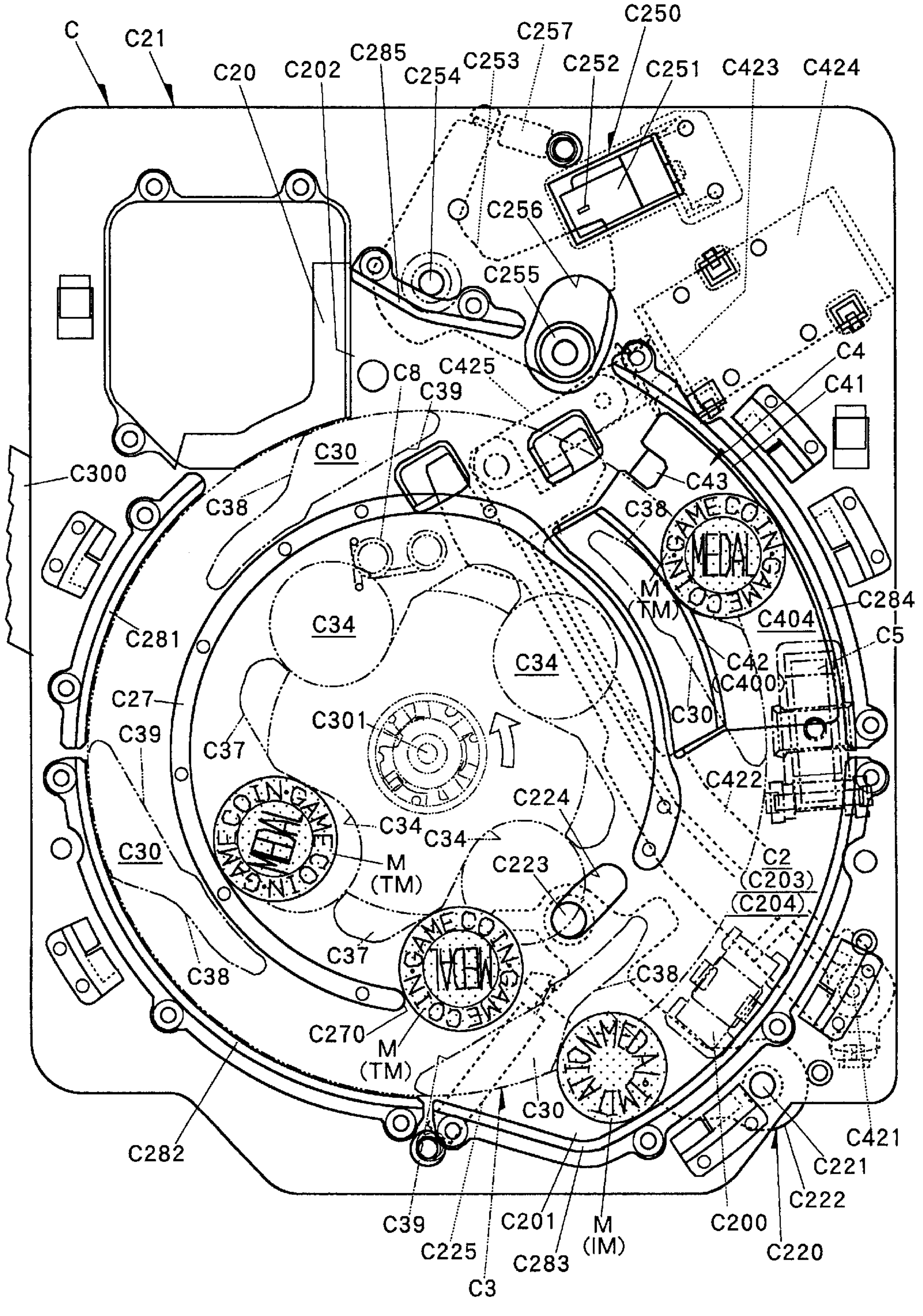
FIG. 29 is a fifth explanatory view of operation of the coin-sending device.

As explained in FIG. 29, true coins TM in a standardized size are supported at both lateral ends opposing in the direction of diameter by the first and second coin supporters C41, C42 to be conveyed without falling in the coin removal opening C404. True coins TM when tend to sink down or slant at their front side at the end of the coin-separation part C4 can be supported or received by the coin-scoop means C43 to be smoothly transferred to the second-side passage C2.

Figure 30:
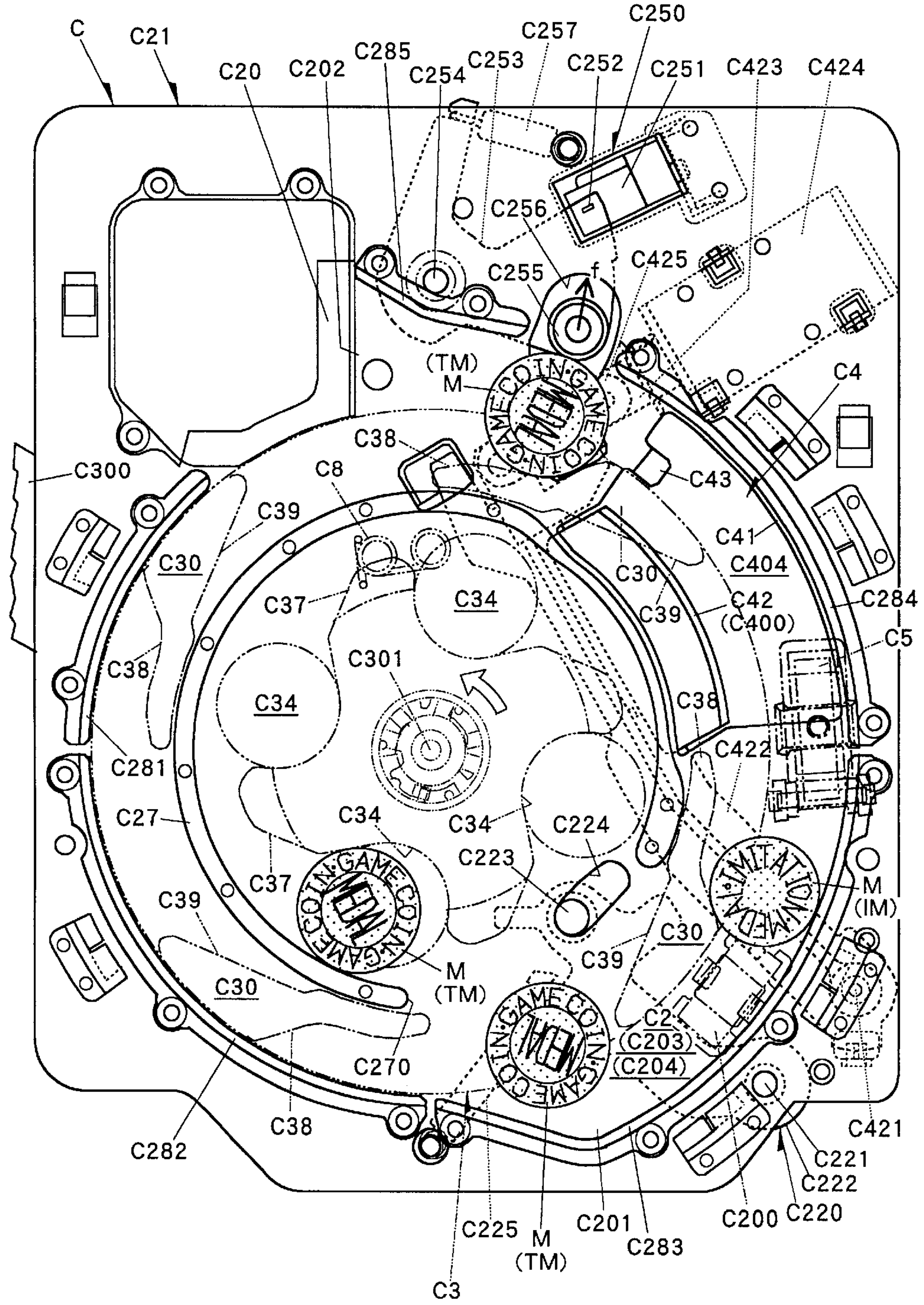
FIG. 30 is a sixth explanatory view of operation of the same.

As shown in FIG. 30, a true-coin sensor C250 is provided downstream of the coin-separation part 4. The sensor C250 comprises a detecting unit C251 using a transmission type photosensor, a swing member C253 swingable to move in and away from a detection optical path C252, a fulcrum C254 for the swing member C253, a pin C255, an elongate slot C256 for the pin and a spring C257 for biasing the swing member. True coins TM subjected to the discriminating operation are brought into contact with the pin C255 to cause the swing member C253 to move backwards counterclockwise (indicated by the arrow f), whereby causing the swing member C253 to be across the optical path C252 to detect a true coin TM and add one to the credit accordingly.

Figure 31:
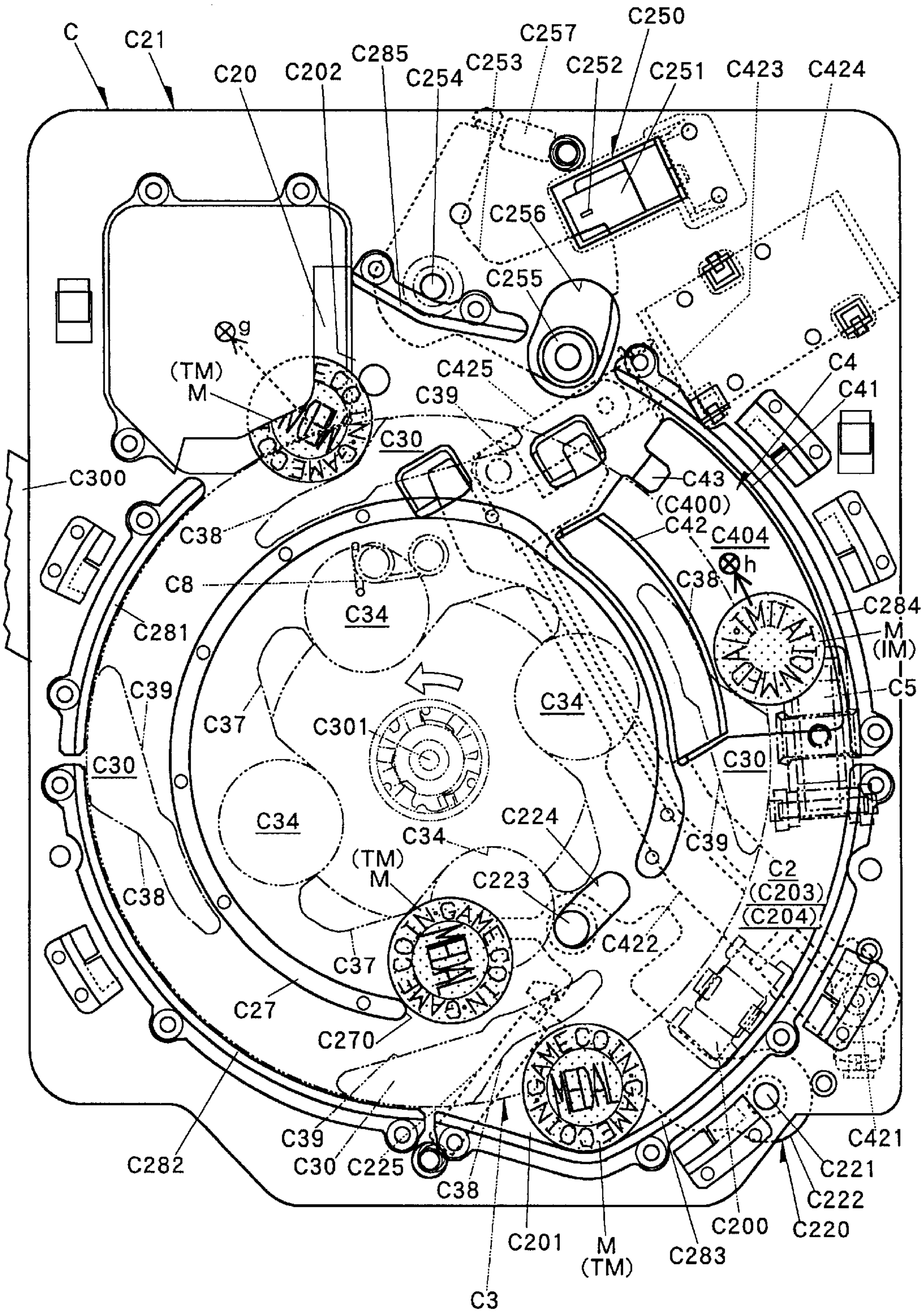
FIG. 31 is a seventh explanatory view of operation of the same.

The true coins TM after passing the sensor C250 are discharged from the outlet C202 of the passage C2, as indicated by the arrow g, to the coin payout hopper 86 through an outlet path C20, as shown in FIG. 31. When a false coin IM smaller in diameter than true coins is introduced to the coin-separation part C4, the false coin is not supported at both lateral ends by the first and second coin supporters C41, C42 and falls in the coin-removal opening C404 (indicated by the arrow h) to the cancel chute 92 through a removal path C40.

Figure 32:
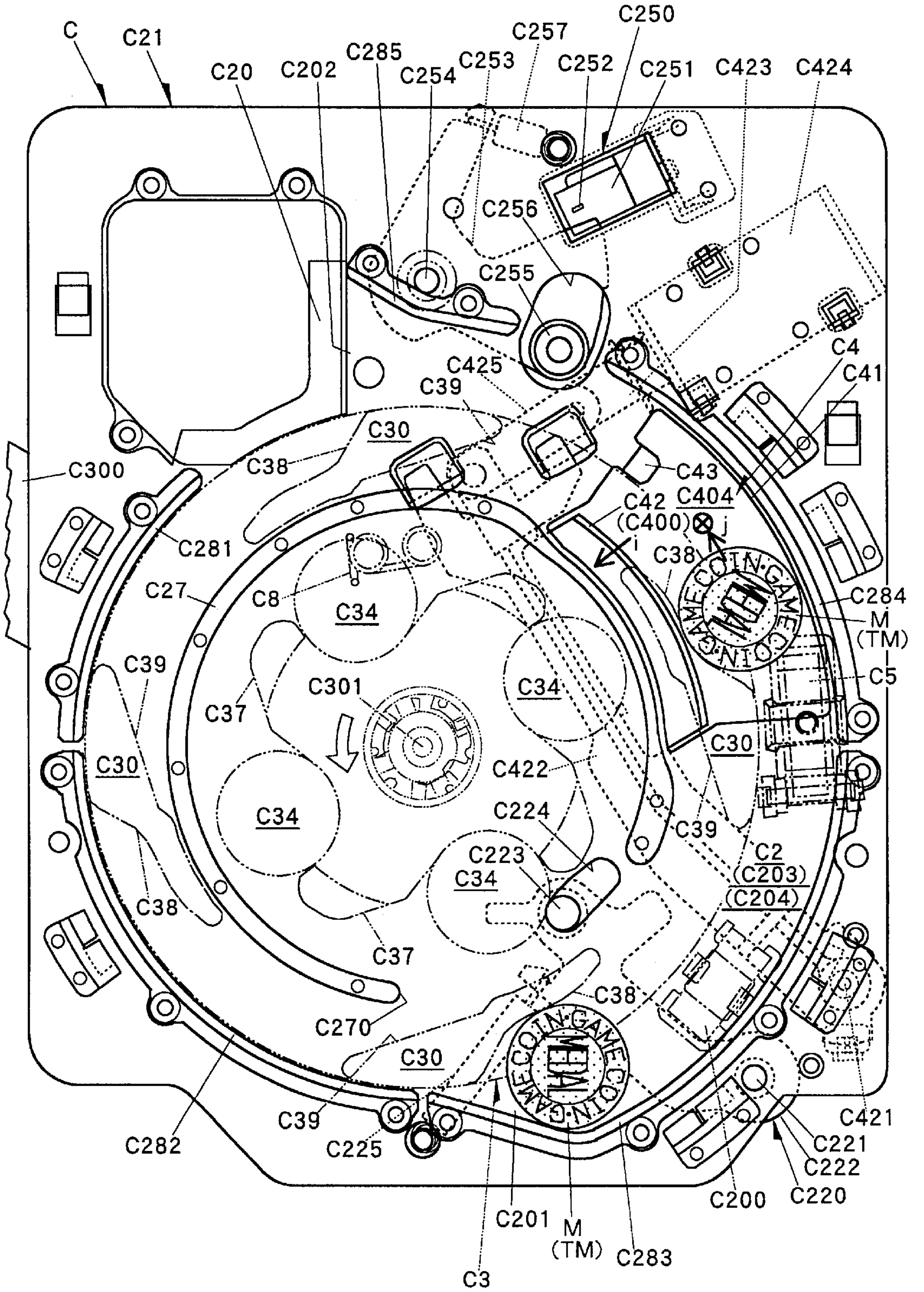
FIG. 32 is an eighth explanatory view of operation of the same.

As seen in FIG. 32, when the electricity is off at the solenoid type drive means C424 provided at the coin-separation part C4, the rod C423 which has been retracted with the electricity being on is stretched to shift the second coin supporter C42 forming the movable member C400 (in the direction indicated by the arrow i) to make larger the width of the removal opening C404. When the rotary disc C3 rotates in this instance, all coins including true coins TM and false coins IM can be retrieved to the cancel chute 92 through the removal opening C404 and removal path C40 (as indicated by the arrow i).

According to the above features, coins placed in the first side reservoir C1 are sent sequentially one by one by the rotary disc C3 slanted forwards downwards to be taken from the outlet C202 of the second-side passage C2 opening at the part slanted backwards upwards. And discrimination of coins is performed through transfer of coins against gravity by the coin separation part C4 formed on the uphill slope C204 of the second-side passage C2. Hence, there is no need to have a large difference in height between the inlet side and outlet side of the coin-sending device C, and an excellent discrimination can be carried out without provision of an additional coin-separation part on the outside of the machine, thereby enabling specific sizes in the direction of height of the machine to be reduced effectively.

Figure 33:
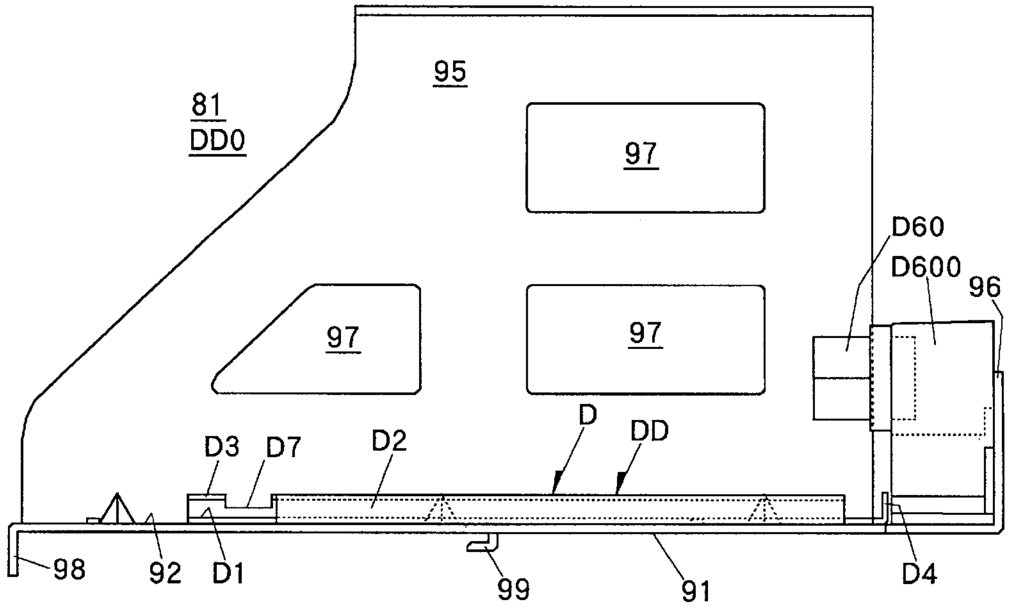
FIG. 33 is a side view of an attach-detach guide means.
Figure 34:
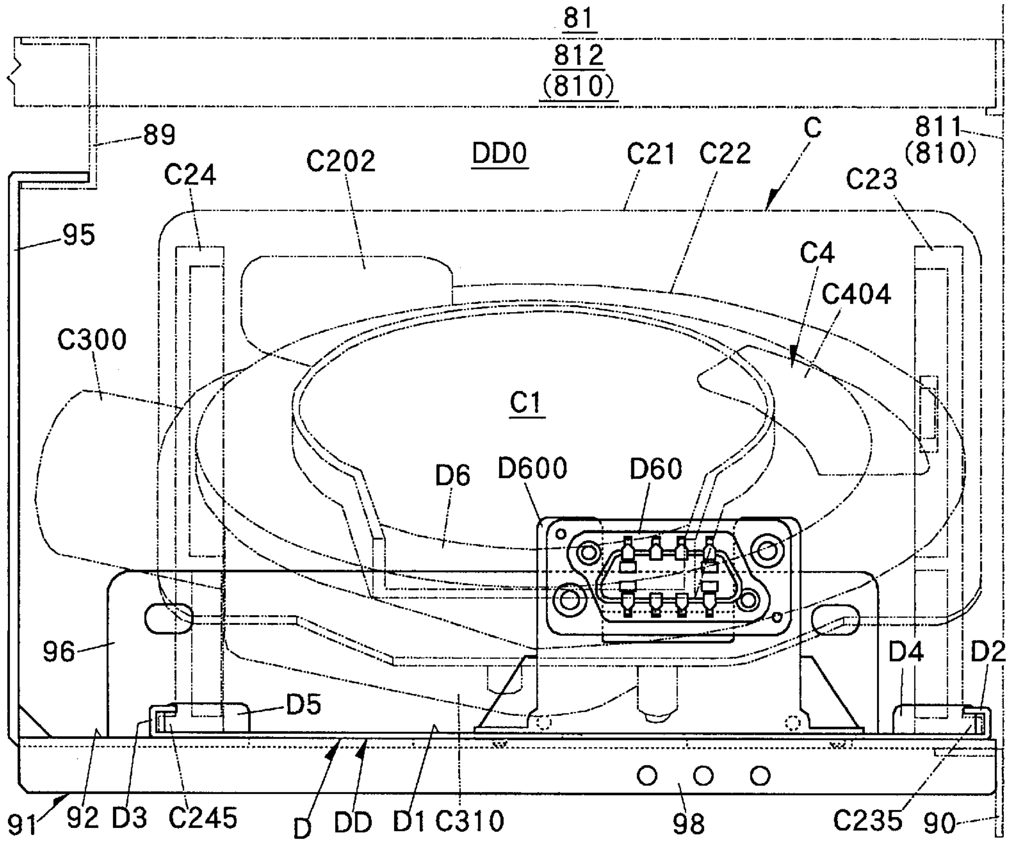
FIG. 34 is a front view of the same.
Figure 35:
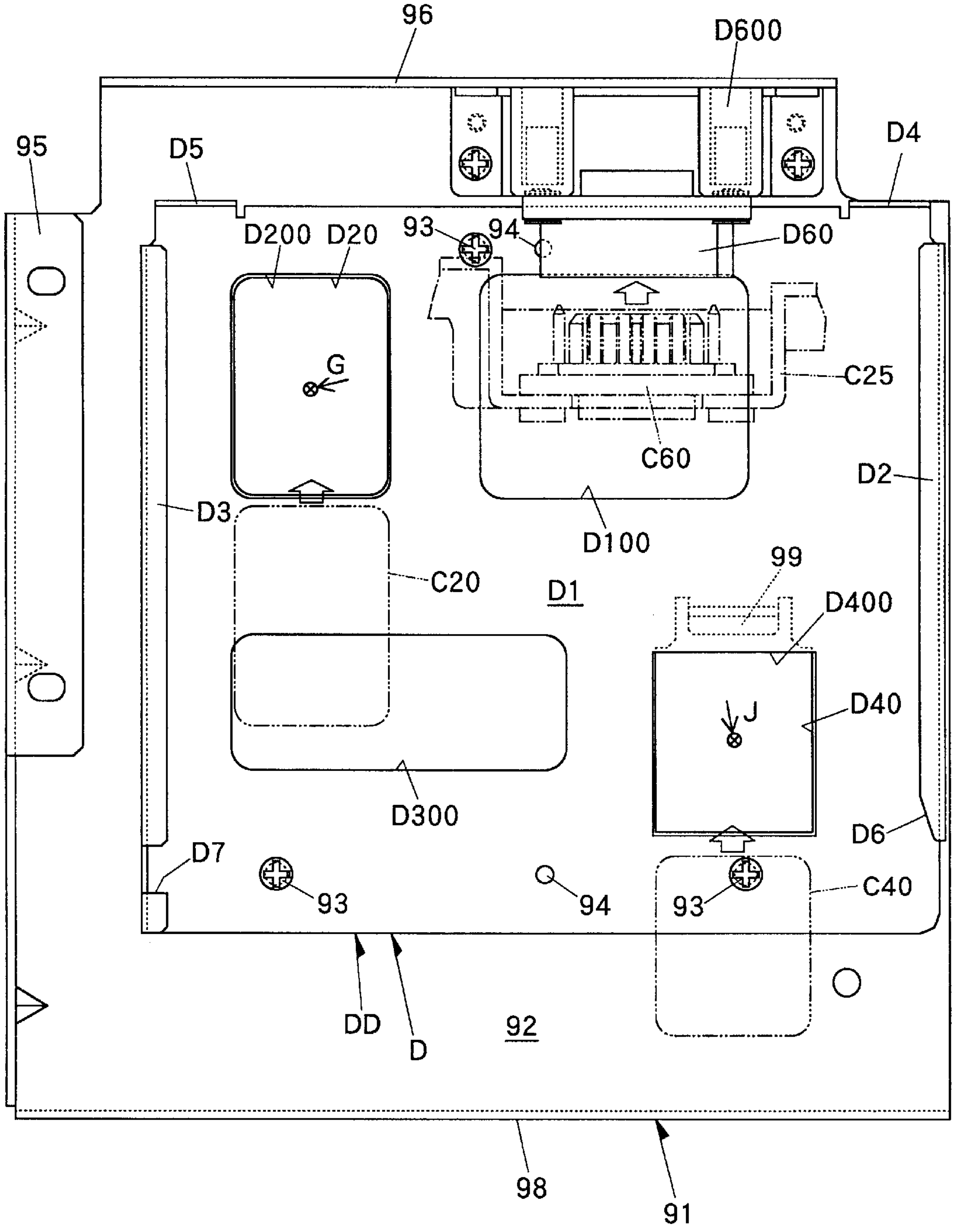
FIG. 35 is a plan view of the same.

Next, an attach-detach guide means D for the coin-sending device C will be detailed. The attach-detach guide means D comprises, as shown in FIGS. 33 to 35, a rail mechanism DD which is made of sheet metal and integrally includes a base plate D1 mounted through screws 93 and positioning pins 94 on the bottom 92 of the support member 91 (which supporting the coin-sending device C), right and left rails D2, D3 and stoppers D4, D5 at the rear edge. The support member 91 has a left side plate 95 standing thereon, so that a shelf DD0 having a front in a rectangular shape is formed by the bottom 92, left side plate 95 of the support member 91, and a right inner frame 811 and a reels-mounting frame 812 forming a frame 810 of the casing 81.

Supported in front of a back plate 96 at the rear of the support member 91 via a connector holder D600 an electric connector D60 which sends and receives signals to and from a control device (described later) for controlling the game machine. Reference numeral 97 designates vent holes opened on the left side plate 95; 98 a bent wall at the front of the bottom 92 provided with an intervening passage C444 as shown in FIG. 17; and 99 a fitting pawl into which the intervening passage C444 being fit at its rear end.

As seen i n FIG. 35, the base plate D1 of the rail mechanism DD is provided with openings D200 and D400 corresponding to communication openings D20 D40 on the bottom 92 of the support member 91, so that in such position that the coin-sending device C has finished being attached to the game machine body 8, an outlet passage C20 of the coin-sending device C is brought into alignment with a communication opening D20 of the bottom 92 through the opening D200 of the base plate D1. Similarly, the coin-removal passage C40 of the coin separation part C4 is aligned with the communication opening D40 on the bottom 92 through the opening D400 of the base plate D1. Other openings D100, D300 on the base plate D1 are not used as a coin passage and are closed on the plane of the bottom 92.

In FIG. 35, C60 is an electric connector mounted on the rear stand C25 of the coin-sending device C and connected, directly or indirectly through a circuit board C500 (see FIG. 36), with a motor C300 for the coin-sending device C, solenoid type drive means C424, and coin sensors C200, C250. In the position that the coin-ending device C has finished being attached to the machine body 8, the electric connector C60 of the coin-sending device C is connected with the electric connector D60 for the machine body 8 supported to the support member 91.

Figure 36:
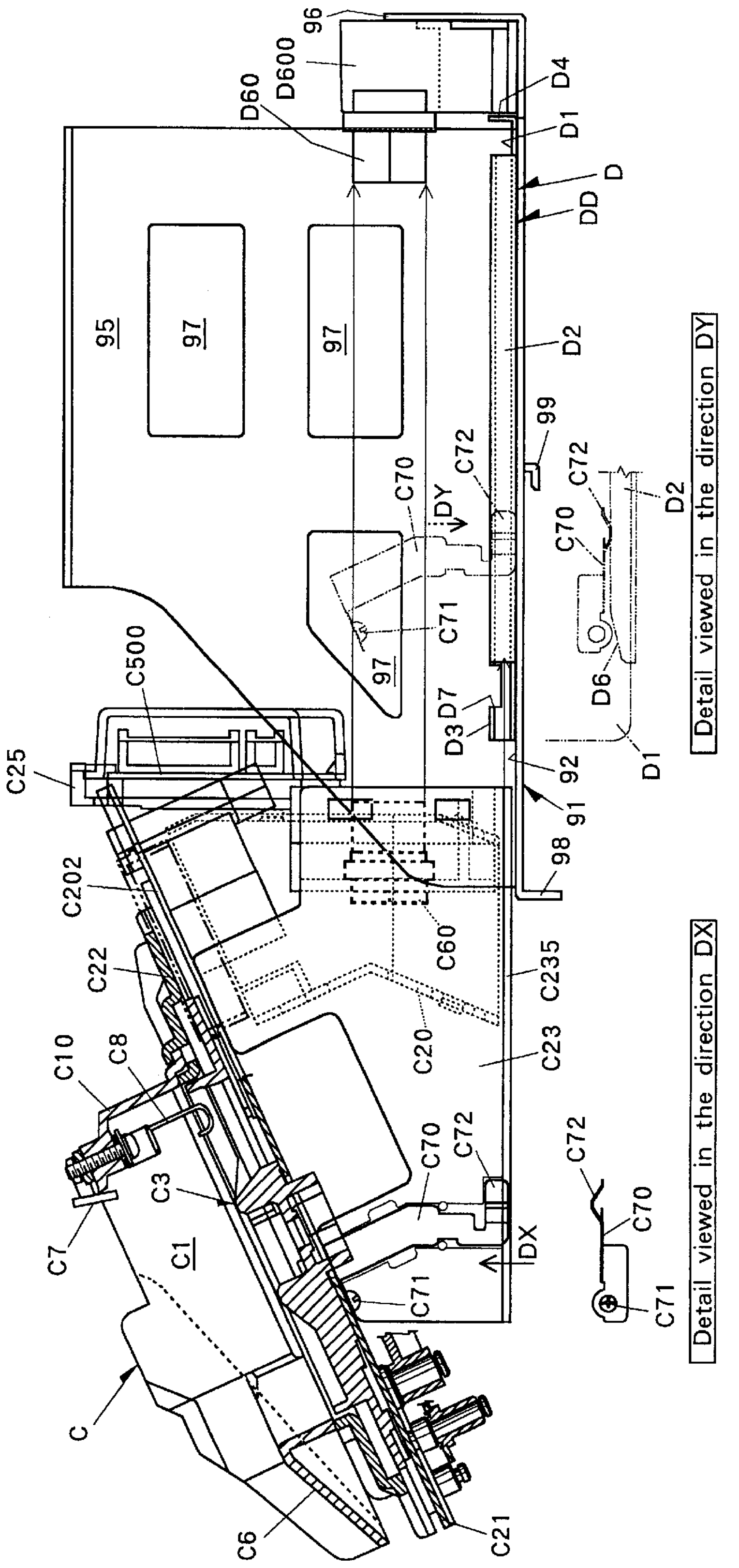
FIG. 36 is a right side view of the coin-sending device in mounting operation.
Figure 37:
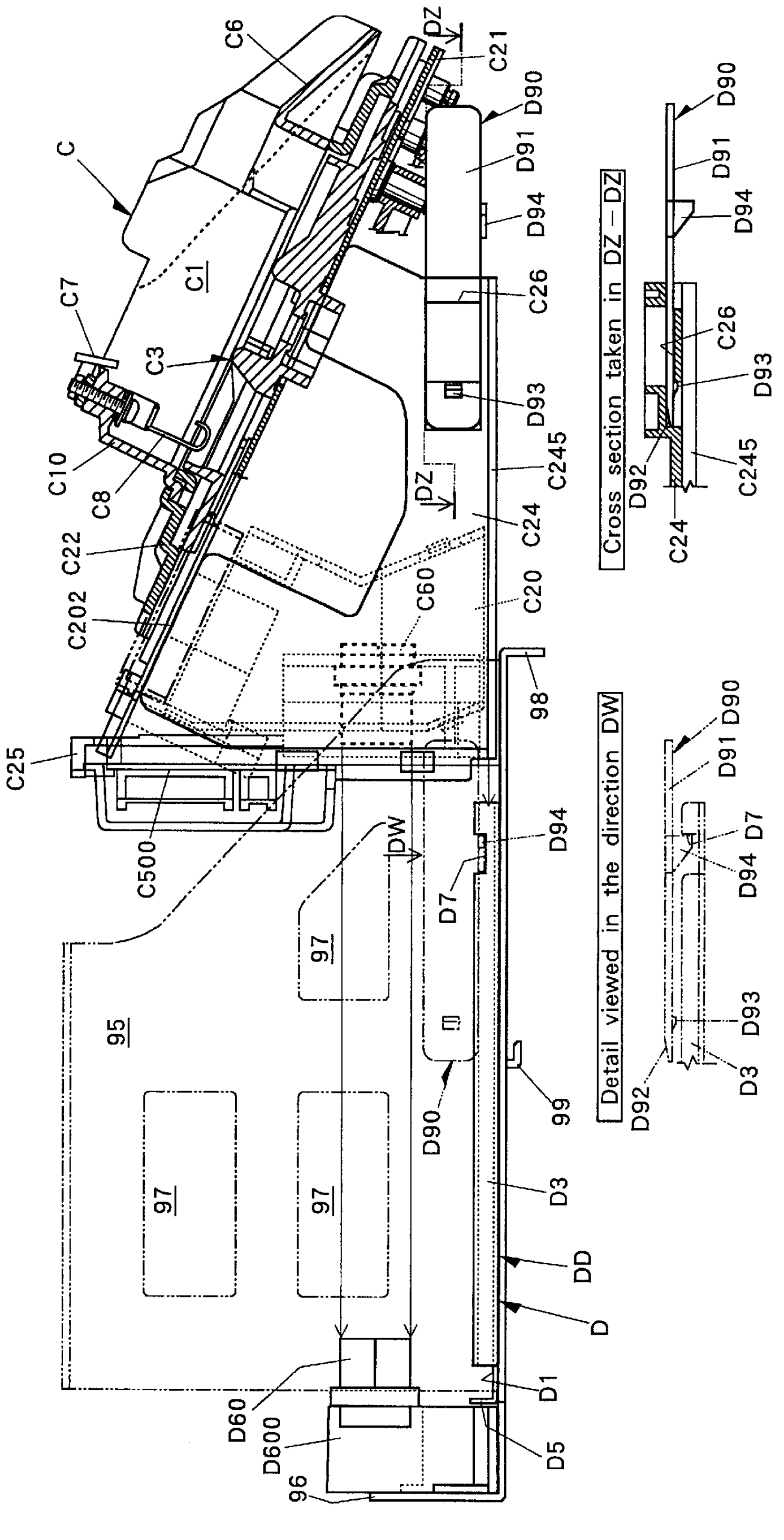
FIG. 37 is a left side view of the same.

As shown in FIGS. 36 and 37, the right and left side stands C23 C24 of the coin-sending device C have at the lower ends lateral pawls C235, C245 which extend lengthwise of the side stands and are fit into the right and left rails D2, D3 to be slided, thereby guiding the coin-sending device C in attaching to and detaching from the machine body 8. In the position that the coin-sending device C has finished being attached to the machine body 8 the side stands C23, C24 and rear stand C25 abut against and be stopped by stoppers D4 and D5.

As seen in FIG. 36, an earth plate C70 is retained on the main base C21 at the back of the bottom by use of a screw C71 with a brush C72 at the lower end of the earth plate C70 being in contact with the inside of the right rail D2 whereby the earth line of the coin-sending device C is connected with the casing earth of the game machine body 8 through the rail mechanism DD entirely made of sheet metal to have conductivity and the support member 91 also having conductivity. The right rail D2 is shorter, at the inlet side, than the left rail D3 and has the inlet side a cut guide D6 tapered for easy insertion.

FIG. 37 shows a releasable holding means D90 which is formed at the lower part of the left side stand C24 of the coin-sending device C and is adapted to engage with a cut D7 at the left rail D3 to hold the coin-sending device C in the position of having finished being attached to the game machine body 8. The holding means D90 is made of synthetic resin material having flexibility and is used in such manner that a chamfered utmost end D92 of a lever-shaped body D91 is inserted into a bore C26 at the left side stand C24 to be retained by a stopper pawl D93. The lever shaped body D91 has a triangular engaging Pawl D94 integrally formed at the lower end and engages The pawl D94 with the cut D7 of the left rail D3 to hold The coin-sending device C in the attaching-finish position. For releasing, the lever shaped body D91 may be inwardly bent at the rear end to disconnect the engaging pawl D94 from the cut D7.

According to the above features, upon attaching the coin-sending device C, the laterally projecting pawls C235, C245 at the lower end of the right and left side stands C23, C24 are received and slided in the right and left rails D2, D3 of the rail mechanism DD, thereby inserting the coin-sending device C inwardly of the machine body 8. When the coin-sending device C is positioned in the attaching-finish position, the outlet passage C20 is automatically aligned with the communicating opening D20 on the bottom 92 of the support member 91, so that coins can be excellently transferred to the coin payout hopper 86 as indicated by the arrow G in FIG. 35.

At the same time, the removal passage C40 of the coin separation part C4 can be automatically aligned with the communicating opening D40 opened on the bottom 92, so that as shown in FIG. 35, false coins can be excellently returned to the cancel chute 92 through the intervening passage C444. Furthermore, upon the coin-sending device C being in the position of having finished being attached to the machine body, the electric connectors C60 and D60 are automatically connected to each other. Also, earth line of the coin-sending device C is automatically set to the casing earth through the earth plate C70 and right rail D2. Moreover, the attaching-finish position of the coin-sending device can be excellently held by engagement between the lever shaped body D91 of the holding means D90 and the cut D7 of the left rail D3.

Upon detaching the coin-sending device C, the lever-shaped body D91 is disconnected from the left rail D3, and the coin-sending device C is slided through the rail mechanism DD to be removed from the machine body 8, whereby the outlet passage C20, removal passage C40, electric connector C60, and earth plate C70 are automatically disconnected to be readily detached.

Accordingly, the coin-sending device C can be readily attached to and detached from the game machine body 8, and cleaning and maintenance can be easily and effectively performed.

Figure 38:
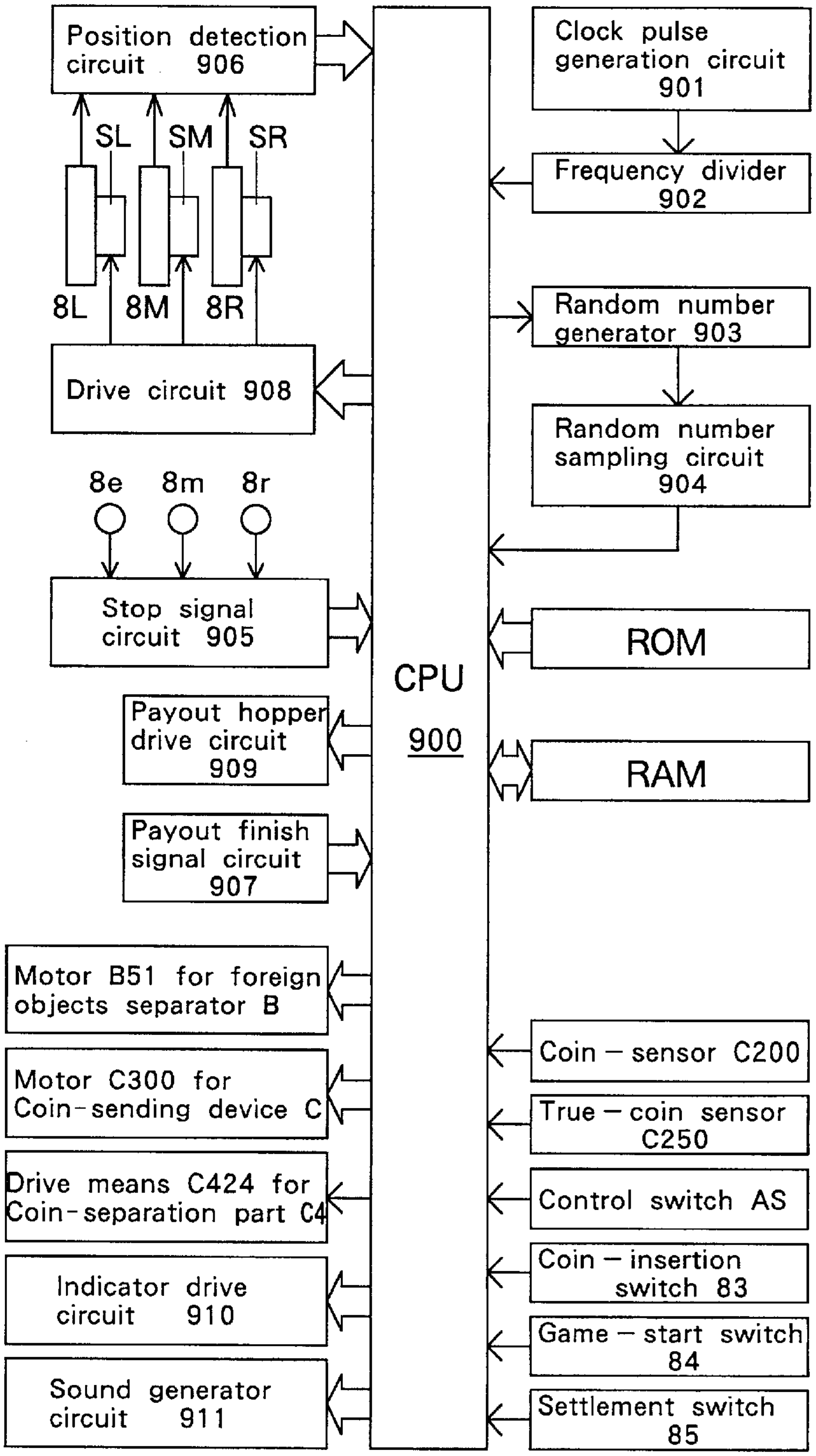
FIG. 38 is a block diagram of controlling the game machine.

FIG. 38 is a block diagram of control for the whole of the game machine. The game machine is provided with a control device 900 comprising a microcomputer CPU, read only memory (ROM) and random access memory (RAM). 901 is a clock pulse generation circuit, 902 a frequency divider, 903 a random number generator used in lottery for generating specific features of winnings, and 904 a random number sampling circuit.

Connected to the input side of the CPU are the inserted-coin sensor 200, true-coin sensor C250, control switch AS, coin-insertion switch 83, game start switch 84, settlement switch 85, a stop signal circuit 905 from the stop buttons 8*e*, 8*m* and 8*r*, a position detector circuit 906 for the reels 8L, 8M and 8R, and a payout finish signal circuit 907 for the coin payout hopper 86.

Connected to the output side of the CPU are the objects to be controlled, i.e., the motor B51 for the foreign objects separator B, motor C300 for the coin-ending device C, solenoid type drive means C424 at the coin-separation part C4, a drive circuit 908 for the stepping motors SL SM SR for the reels 8L, 8M and 8R, a hopper drive circuit 909 for the coin-payout hopper housed in the coin payout hopper 86, an indicator drive circuit 910, and a sounds generation circuit 911.

Figure 39:
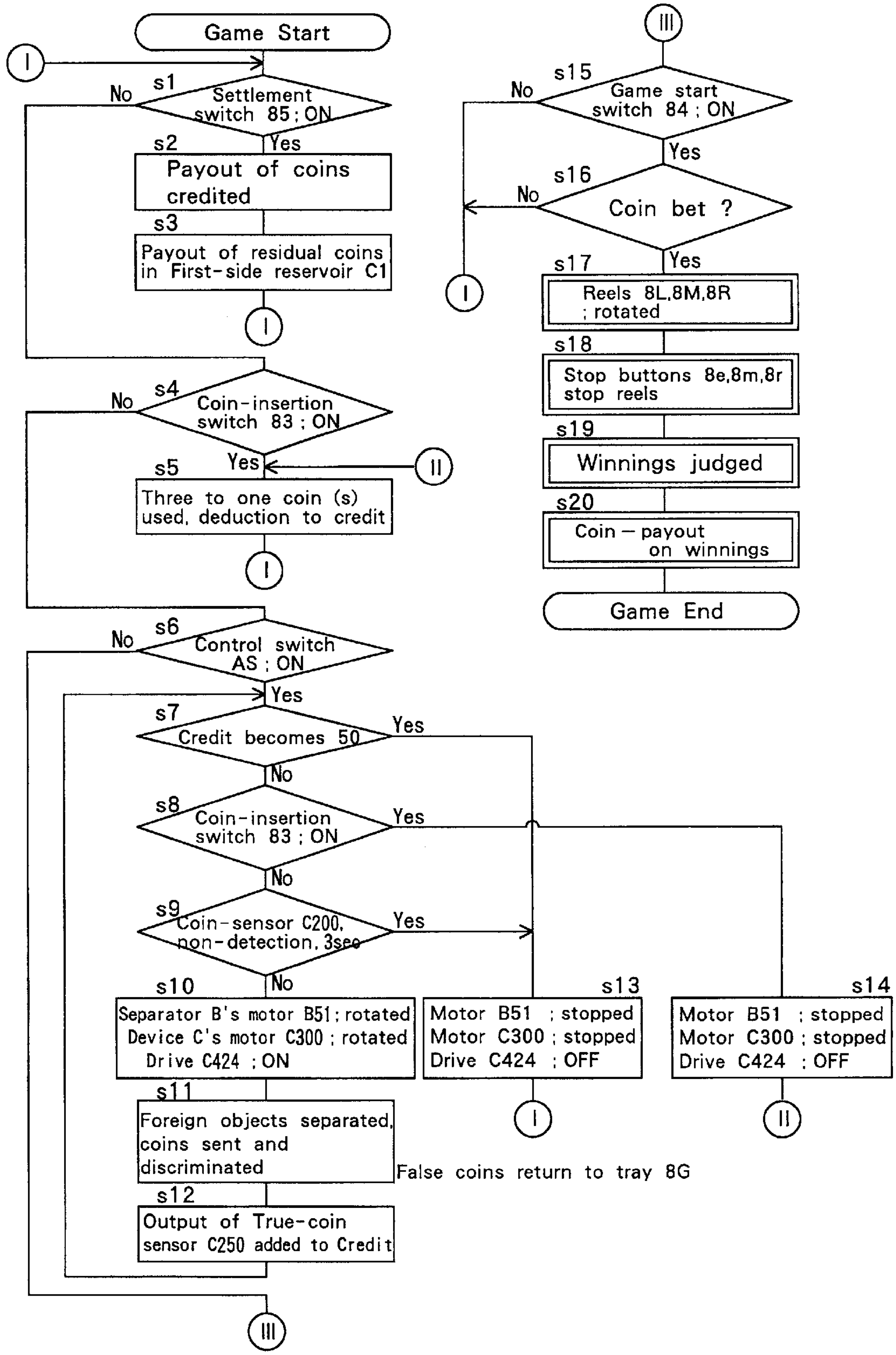
FIG. 39 is a flow chart of controlling the same.
Figure 40:
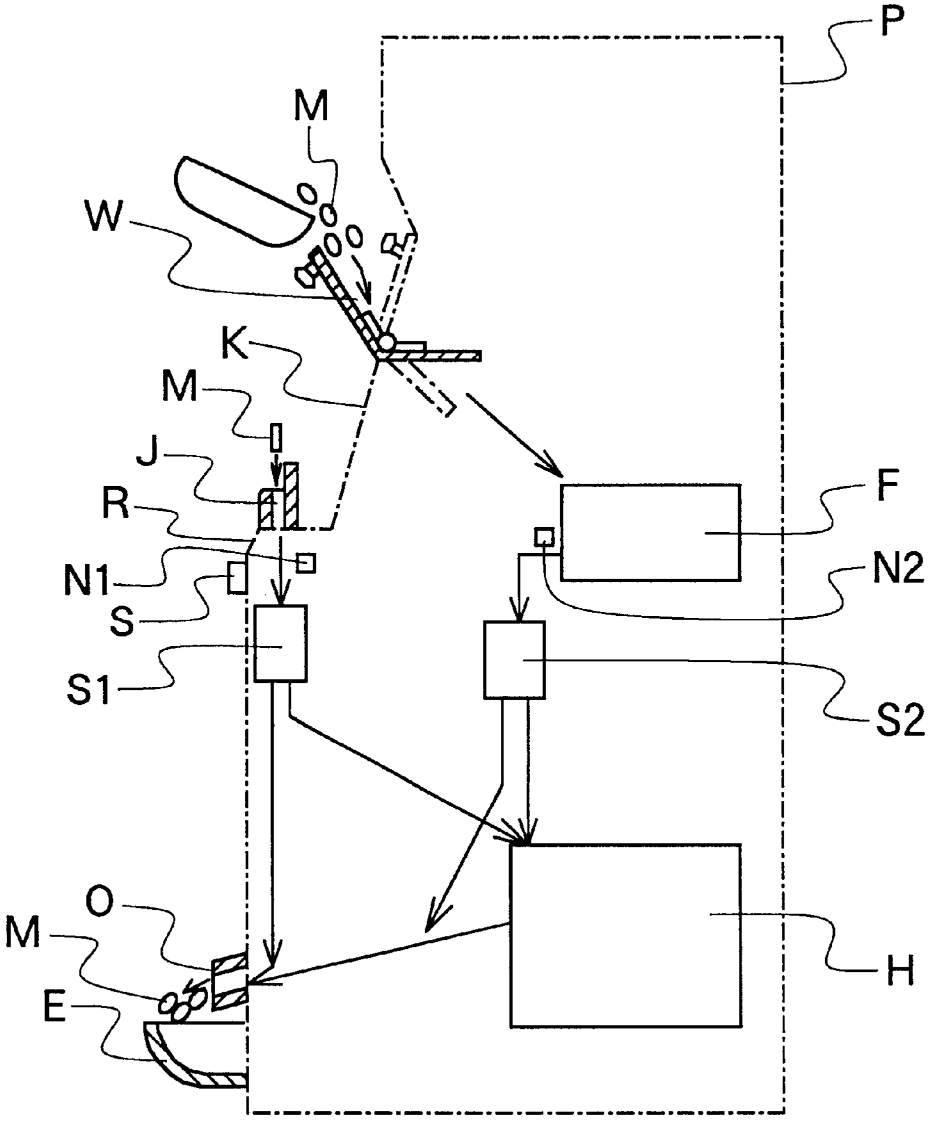
Fig. 40 Prior Art
FIG. 40 is an explanatory view for Prior Art.

FIG. 39 shows control by the control means 900 from the start of the game to the end thereof.

In case that the settlement switch 85 is turned on to request coin-payout (the step S1), coins corresponding to the credit are paid out from the coin payout hopper 86 to the payout tray 8G (S2) and coins remaining in the first-side reservoir C1 are then paid out to the tray 8G (S3), and the control returns to the initial state. Upon payout of the residual coins, motors B51, C300 for the separator B and the coin-sending device C are rotated with the solenoid type drive means 424 being turned off.

In case that the settlement switch is not turned on, when the coin-insertion switch 83 is turned on (S4), any of three to one coin(s) corresponding to the number of depression of the switch 83 is used or bet from the credit, and the credit is subjected to deduction accordingly (S5), and the control returns to the initial state.

When the control switch AS is turned on (S6), the motors B51 and C300 for the separator B and coin-sending device C are driven rotated and the solenoid type drive means C424 for the coin separation part C4 is turned on (S10) unless any of such events occurs that the number of coins in the credit becomes an upper limit 50 (S7); the coin-insertion or bet switch 83 is turned on (S8); or the coin sensor C200 continues non-detecting state for 3 seconds with no coins being actually sent from the rotary disc (S9). The specification provides or allows that in case that the control switch AS is depressed once to be turned on, letting go of the control switch AS causes no troubles or problems.

Then, separation of foreign objects by the separator B, sending coins by the coin-sending device C, and discrimination of true and false coins by the coin separation part C4 are carried out (S11), resulting in that false coins found in the coin separation are returned to the tray 8G. Regular true coins can be detected by the true coins sensor C250 and added to the credit (S12)

On the way of the processes of the step S6 and the following steps, when the credit becomes 50 (S7), or the coin sensor C200 continues non-detection state for 3 seconds (S9), the motors B51 and B300 are stopped and the drive means C424 is turned off (S13) and the control returns to the initial state. On the way of the operation, when the coin-insertion or bet switch 83 is turned on (S8), the motors B51, B300 are turned off (S14), followed by returning to the initial state after coin-insertion or betting and deduction in the credit (S5).

When the game start switch 84 is turned on (S15), in case that any of three to one coin(s) are normally used or bet from the credit (S16), rotation of the reels 8L, 8M and 8R (S17), stopping by the stop buttons 8*e*, 8*m*, 8*r* (S18), determination of winnings (S19) and payout of coins according to winnings (S20) are performed followed by ending the game. When winnings occur, coins in number corresponding to specific features of winnings may be added to the credit, or actually paid out to the payout tray 8G from the coin payout device 86 through a payout port 861 (see FIG. 2) and cancel chute 92.

What I claimed is:

1. A game machine comprising a machine body provided with a coin-sending device sequentially sending coins inserted in a lump to take them into the inside of the game machine, wherein there is provided an attach/detach guide means which guides attaching and detaching of the coin-sending device with respect to the game machine body and causes an outlet passage of the coin-sending device at a position of having finished in attaching to be aligned with a communication opening on the game machine body.

2. A game machine as set forth in claim 1, wherein the coin-sending device includes a coin separation part for discriminating true and false coins and causing false coins to be removed from passage, and a removal passage at the coin-separation part is aligned with a communication opening on the machine body at such a position that the coin-sending device has finished in attaching to the game machine body.

3. A game machine as set forth in claim 2 wherein a communication opening of the game machine body is formed on the bottom of a support member supporting the coin-sending device.

4. A game machine as set forth in claim 1, wherein connectors between the coin-sending device and the game machine body are connected at such position that the coin-sending device has finished in attaching to the machine body.

5. A game machine as set forth in claim 4 wherein an earth line of the coin-sending device is caused to contact with a conductor part of the attach/detach guide means and be connected with a casing earth of the game machine body.

6. A game machine as set forth in claim 1, wherein there is provided a detachable holding means for holding the position of the coin-sending device that the coin-sending device has finished in attaching to the game machine body.

* * * * *